US010802683B1

(12) United States Patent
Griffin et al.

(10) Patent No.: US 10,802,683 B1
(45) Date of Patent: Oct. 13, 2020

(54) METHOD, SYSTEM AND COMPUTER PROGRAM PRODUCT FOR CHANGING AVATARS IN A COMMUNICATION APPLICATION DISPLAY

(71) Applicant: Cisco Technology, Inc., San Jose, CA (US)

(72) Inventors: Keith Griffin, Oranmore (IE); Justin Styler, Lehi, UT (US); Ian Shields, Mountain View, CA (US); Marcellos Parker, Alpine, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 296 days.

(21) Appl. No.: 15/434,084

(22) Filed: Feb. 16, 2017

(51) Int. Cl.
*G06F 3/0484* (2013.01)
*G06F 3/0481* (2013.01)
*H04L 29/08* (2006.01)

(52) U.S. Cl.
CPC .......... *G06F 3/0484* (2013.01); *G06F 3/0481* (2013.01); *H04L 67/24* (2013.01)

(58) Field of Classification Search
None
See application file for complete search history.

(56) References Cited

U.S. PATENT DOCUMENTS

| 7,913,176 B1 | 3/2011 | Blattner et al. |
| 8,620,850 B2 | 12/2013 | Brown et al. |
| 8,694,899 B2 | 4/2014 | Goossens et al. |
| 10,178,056 B2* | 1/2019 | Cunico .................... H04L 67/22 |
| 2006/0064646 A1* | 3/2006 | Kelso ...................... H04L 51/04 715/772 |
| 2007/0133594 A1* | 6/2007 | Pazhyannur .......... H04L 51/063 370/465 |
| 2008/0082613 A1* | 4/2008 | Szeto ................... G06Q 10/107 709/206 |
| 2008/0240384 A1* | 10/2008 | Suryanarayana ....... H04L 51/04 379/88.21 |
| 2008/0301556 A1* | 12/2008 | Williams ................ G06T 13/40 715/706 |
| 2009/0106677 A1* | 4/2009 | Son ........................ H04L 67/24 715/764 |
| 2009/0300525 A1 | 12/2009 | Jolliff et al. |
| 2010/0110160 A1* | 5/2010 | Brandt ................ H04L 12/1818 348/14.08 |

(Continued)

OTHER PUBLICATIONS

D'Onfro, Jillian; 11 Gchat and Google Hangouts Tricks You Need to Know (Dec. 12, 2014) Can be seen at: http://www.businessinsider.com/google-chat-hangouts-tips-and-tricks-2014-12?op=1.

(Continued)

*Primary Examiner* — James T Tsai
(74) *Attorney, Agent, or Firm* — Polsinelli PC

(57) ABSTRACT

In one embodiment, a method comprising: obtaining, by a server from a first user device, an image via a first instance of a communication application; obtaining, by the server from the first user device, an indication of availability status; generating, by the server, an avatar image based on the image and the indication of availability status, the avatar image including at least a portion of the image and one or more characters indicative of the availability status; and transmitting, by the server to a second user device, the avatar image for display in a second instance of the communication application.

16 Claims, 9 Drawing Sheets

(56) References Cited

U.S. PATENT DOCUMENTS

| | | | |
|---|---|---|---|
| 2011/0078564 A1* | 3/2011 | Almodovar Herr Iz | G06F 17/271 715/262 |
| 2011/0109648 A1* | 5/2011 | Roberts | H04N 21/4788 345/629 |
| 2014/0067797 A1* | 3/2014 | Kennedy | G06Q 10/063112 707/723 |
| 2014/0143693 A1* | 5/2014 | Goossens | G06Q 10/10 715/764 |
| 2014/0173424 A1* | 6/2014 | Hogeg | H04N 21/47205 715/255 |
| 2016/0044168 A1* | 2/2016 | Campbell | H04M 3/42374 370/259 |
| 2016/0217429 A1* | 7/2016 | Lau | G06Q 10/107 |
| 2016/0259650 A1* | 9/2016 | Lewis | G06F 9/4411 |
| 2018/0088787 A1* | 3/2018 | Bereza | G06F 3/04845 |

OTHER PUBLICATIONS

Griffiths, Sarah; Now You Can Make Your Own Snapchat Lenses (Published: 10:33 GMT, Jul. 21, 2016) Can be seen at: http://www.dailymall.co.uk/sciencetech/article-3701038/Now-make-Snapchat-lenses-Fun-Face-Paint-feature-lets-draw-selfies.html.

Habchi, Ayoub; How to Create Custom Overlays for Google Hangouts (posted on YouTube on Aug. 31, 2013) Can be seen at: https://www.youtube.com/watch?v=c5nHTxJ660k.

Hangoutshelp Forum; Hangouts Help—Change Hangouts Setting on a Computer (2016) Can be seen at: https://support.google.com/hangouts/answer/6024193?hl=en.

Kleinfeld, Sanders; How to Add Custom Status and Away Messages to Slack (Dec. 7, 2015) Can be seen at: https://medium.com/@sandersk/how-to-add-custom-status-and-away-messages-to-slack-d62f4f3fc32d#.9a5hnjb5j.

Lync Server, How User Photos are Displayed in Lync (2013) Can be seen at: https://technet.microsoft.com/en-us/library/dn783119(v=ccs.15).aspx.

Messieh. Nancy; 3 Awesome Ways to Add Text & Designs to Your Iphone Photos (Jul. 27, 2013) Can be seen at: http://www.makeuseof.com/tag/3-awesome-ways-to-add-text-designs-to-your-iphone-photos/.

Poshmark; Sign Up to Shop Your Favorite Brands at Up to 70% Off Retail (2016) Can be seen at: https://poshmark.com/listing/PM-APP-OFFERS-VACATION-HOLD-OPTION-579109cdeaf03061e200730a.

Singh, Kyli; 9 Snapchat Tips and Tricks You May Not Know About (Aug. 13, 2014) Can be seen at: http://mashable.com/2014/08/13/snapchat-tips-and-tricks/#JDcinLmKq5qx.

Srichurat, Somsit; Emoji Picture Editor, Current Version: 1.0, Released: Mar. 4, 2016 Can be seen at: http://www.148apps.com/app/1081219558/.

Constable, Peter; Understanding Characters, Keystrokes, Codepoints and Glyphs (May 28, 2003).

* cited by examiner

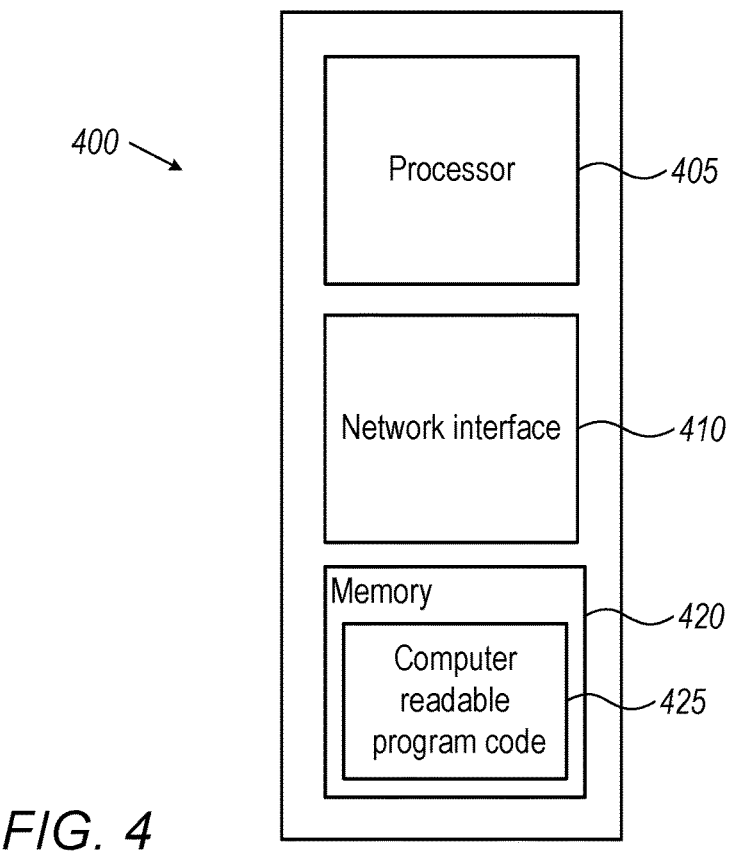
FIG. 4
FIG. 5
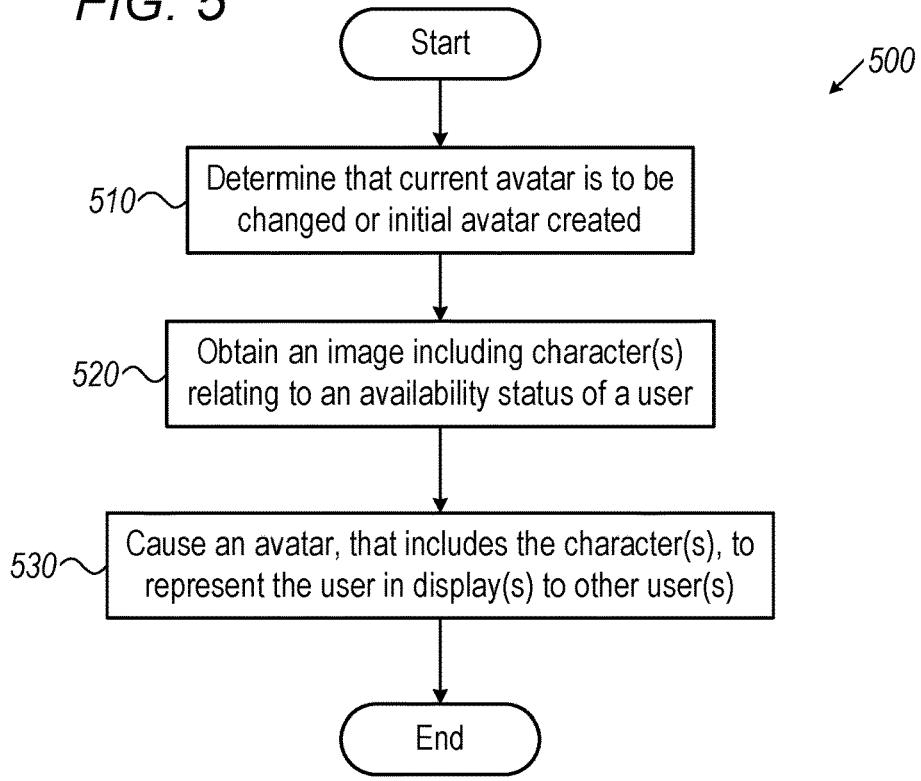

| July 24, 2016 – July 30, 2016 | | | | | | |
|---|---|---|---|---|---|---|
| Sunday | Monday | Tuesday | Wednesday | Thursday | Friday | Saturday |
| 24 | 25 | 26 | 27 | 28<br>On vacation | 29 | 30 |

| | Sun | Mon | Tue | Wed | Thu | Fri | Sat |
|---|---|---|---|---|---|---|---|
| 7AM | | | | | | | |
| 8 | | | | | | | |
| 9 | | | | | | | |
| 10 | | | | Meeting | | | |
| 11 | | | | | | | |
| 12PM | | | | | | | |
| 1 | | | | | | | |
| 2 | | | | | | | |
| 3 | | | | | | | |
| 4 | | | | | | | |
| 5 | | | | | | | |
| 6 | | | | | | | |

मेथड, SYSTEM AND COMPUTER
PROGRAM PRODUCT FOR CHANGING
AVATARS IN A COMMUNICATION
APPLICATION DISPLAY

TECHNICAL FIELD

The present disclosure generally relates to user devices associated with screens, including but not limited to user devices with screens embedded within or operatively coupled for displaying avatars.

BACKGROUND

A communication application often supports the use of "avatars", i.e., images that represent users in displays of the communication application. Examples of communication applications may include instant messaging applications, social network applications, collaboration applications, email applications, and/or any other type(s) of communication applications.

BRIEF DESCRIPTION OF THE DRAWINGS

So that the present disclosure may be understood by those of ordinary skill in the art, a more detailed description may be had by reference to aspects of some illustrative implementations, some of which are shown in the accompanying drawings. The appended drawings, however, illustrate only some example features of the present disclosure and are therefore not to be considered limiting, for the description may admit to other effective features.

FIG. 4 is a block diagram of a server, in accordance with some embodiments of the presently disclosed subject matter;

FIG. 5 is a flowchart of a generalized method, in accordance with some embodiments of the presently disclosed subject matter;

FIG. 11 illustrates a calendar of a user, in accordance with some embodiments of the presently disclosed subject matter.

Figure 1:
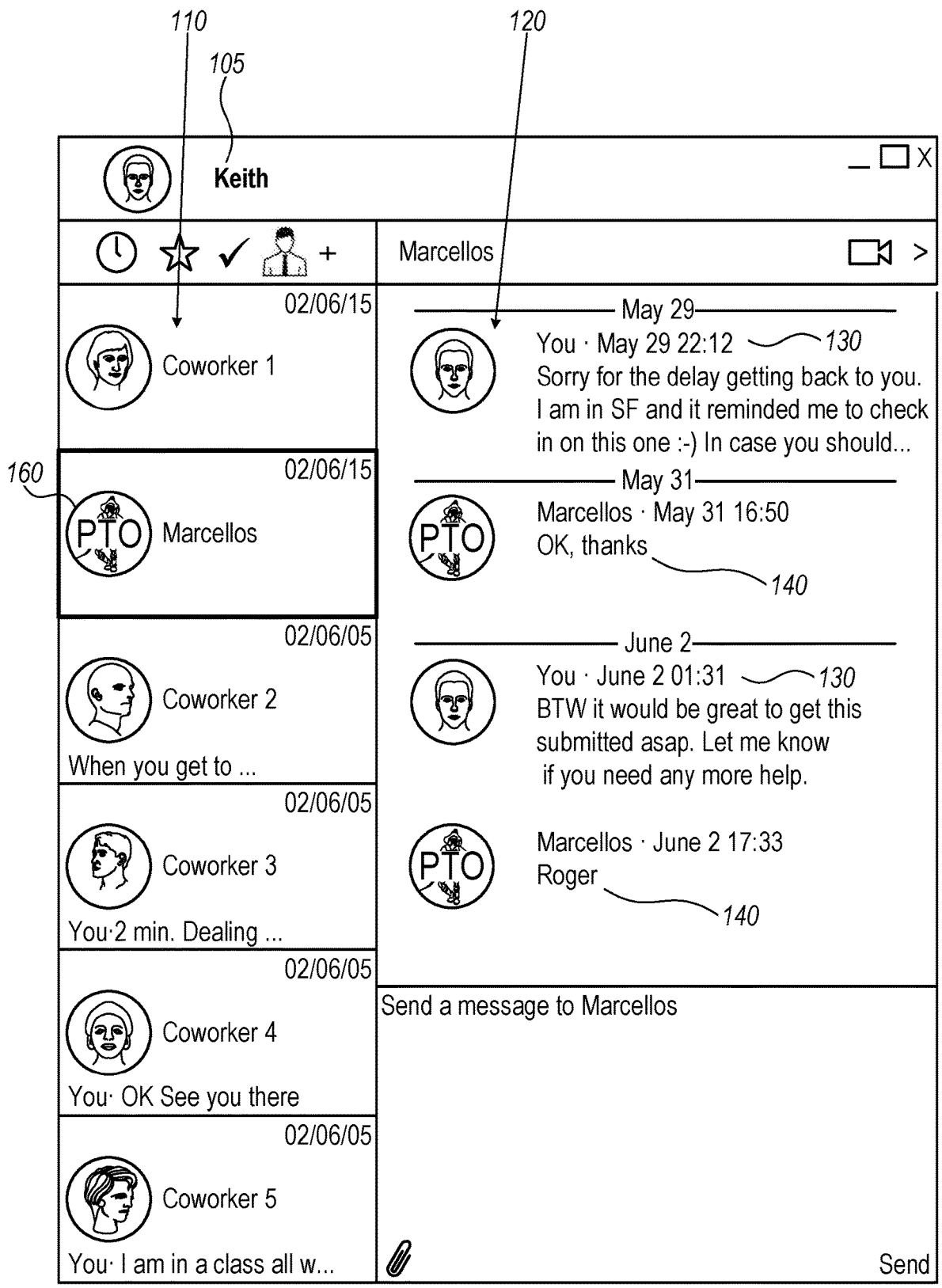
FIG. 1 is a simplified pictorial illustration of an exemplary display for a communication application in which an avatar may act as a visual indicator of availability status, constructed and operative in accordance with some embodiments of the presently disclosed subject matter.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, etc. Finally, like reference numerals may be used to denote like features throughout the specification and figures.

DESCRIPTION OF EXAMPLE EMBODIMENTS

Overview

There is provided, in accordance with some embodiments of the presently disclosed subject matter, a method comprising: obtaining, by a server from a first user device, an image via a first instance of a communication application; obtaining, by the server from the first user device, an indication of availability status; generating, by the server, an avatar image based on the image and the indication of availability status, the avatar image including at least a portion of the image and one or more characters indicative of the availability status; and transmitting, by the server to a second user device, the avatar image for display in a second instance of the communication application.

DETAILED DESCRIPTION OF EXAMPLE EMBODIMENTS

It will be appreciated that an avatar may represent a user in displays of a communication application. In accordance with some embodiments of the presently disclosed subject matter, the avatar that represents the user may convey information regarding the availability status of the user. The avatar may therefore be considered to act as a visual indicator of the availability status of the user. Having an avatar that represents a particular user act as a visual indicator of the availability status of that user, or in other words convey information regarding the availability status of the particular user, may prevent unnecessary communication with the particular user (whether by way of the communication application and/or by way of other means such as another communication application). Additionally or alternatively, using an avatar, that in any event represents the particular user, also as a visual indicator of the availability status of that user may avoid or eliminate diversion of other resources for indicating availability status within the communication application or by way of other means. Thus such an avatar may in some embodiments save time for the particular user and any other user that may otherwise be unnecessarily communicating with the particular user. Such an avatar may additionally or alternatively in some embodiments allow an optimization of resources e.g. relating to the communication application.

Referring now to the drawings, FIG. 1 is a simplified pictorial illustration of an exemplary display 100 for a communication application in which an avatar may act as a visual indicator of availability status, constructed and operative in accordance with some embodiments of the presently disclosed subject matter. Display 100 may represent an application display for a collaboration application, such as Cisco Spark® that supports conversations among multiple users. It will be appreciated that the embodiments described herein may be implemented within the context of any other communication application, such as, for example, Microsoft Outlook®, Jabber®, Facebook® or WhatsApp®.

As shown in FIG. 1, display 100 may comprise conversation panel 110 and conversation details panel 120. Conversation panel 110 may include a list of conversations in which a user, associated with display 100 and noted as being named "Keith" at section 105 of display 100, is a participant. Section 105 also displays the avatar that represents "Keith". Display 100 may be displayed on a screen embedded in, or operatively coupled to, user device 220 (e.g. 220B FIG. 2) associated with Keith.

The list of conversations in conversation panel 110 is assumed for simplicity's sake to represent conversations with coworkers of Keith. Therefore conversation panel 110 may show various avatars representing co-workers of Keith, including Marcellos and co-worker 1, coworker 2, coworker 3, coworker 4, and coworker 5. Avatar 160 representing the user named "Marcellos" includes the characters "PTO", an acronym for "Paid Time Off", meaning paid vacation. Therefore avatar 160 may convey availability status information relating to Marcellos, namely that Marcellos is on vacation. As long as "Keith" is aware of the meaning of "PTO", Keith may understand when viewing avatar 160 in display 100 that Marcellos is on vacation. Therefore an avatar including the characters "PTO" may be an example of an avatar that conveys availability status information in a manner that is not expected to be misinterpreted by any user aware of the meaning of the acronym.

Conversation details panel 120 may provide a display of the details of one of the conversations from conversation panel 110. For example, as depicted in FIG. 1, conversation details panel 120 may comprise the details of a conversation between "Keith" associated with the display and referred to as "You" and the user named "Marcellos", (e.g. before Marcellos went on vacation). Conversation details panel 120 may therefore comprise one or more posts 130 of the user associated with display 100 (i.e. Keith) and/or one or more posts 140 of the user Marcellos.

For simplicity of description, embodiments of an avatar representing a user of a communication application in display(s) of the communication application, will be described below with reference to a single communication application ("the communication application"). However, it should be understood that the same avatar may in some cases represent the user in display(s) of a plurality of communication application(s) in which the user participates.

Figure 2:
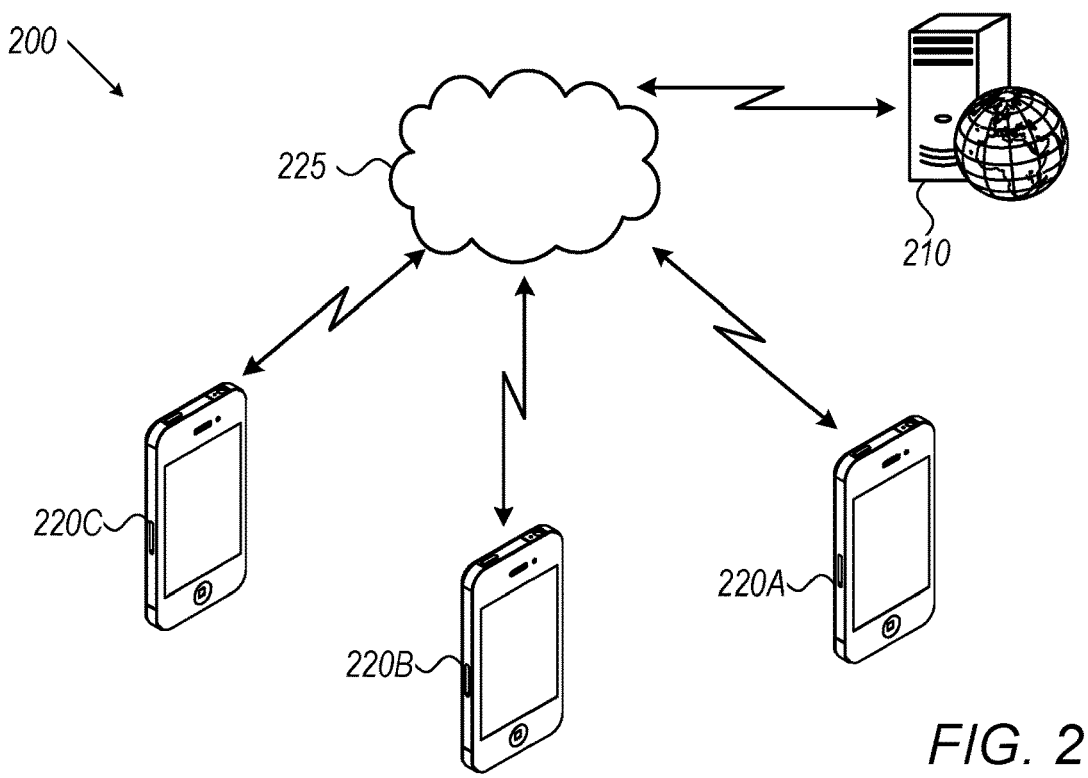
FIG. 2 is a schematic illustration of a system, in accordance with some embodiments of the presently disclosed subject matter.

Reference is now made to FIG. 2 which is a schematic illustration of a system 200, in accordance with some embodiments of the presently disclosed subject matter.

In the illustrated embodiments, system 200 may include one or more user devices 220 and/or one or more servers 210 associated with a communication application. Each user device 220 may be associated with the communication application and may be associated with a user (such as Keith or Marcellos) that uses the communication application. A particular user may be associated with one or more user devices 220. Although for simplicity of illustration user devices 220 are shown in FIG. 2 as smartphones, any user device 220 may be of any appropriate type. For example, a particular user device 220 may be a personal computer, laptop, tablet, or smartphone, etc. For simplicity of illustration, three user devices 220 (user device 220A, user device 220B and user device 220C) are shown in FIG. 2.

For simplicity of illustration, one server 210 is shown in FIG. 2. Depending on the embodiment, the service(s) provided by any particular server 210 may or may not be in accordance with cloud computing. As is known in the art, cloud computing is a model for enabling ubiquitous, convenient, on-demand network access to a shared pool of configurable computing resources (e.g., networks, servers, storage, applications and services), that can be rapidly provisioned and released with minimal management effort or service provider interaction. Characteristics of cloud computing may include: on-demand self-service, broad network access, resource pooling, rapid elasticity, measured service, etc. Any cloud may be a public cloud, a private cloud, a community cloud, a hybrid cloud, etc. Service models for a cloud may include software as a service, platform as a service, infrastructure as a service, etc.

Any two user device(s) 220 and/or server(s) 210 in system 200 may be operative to communicate with one another via one or more networks 225. For simplicity's sake, FIG. 1 illustrates one network, but in some embodiments there may be a plurality of networks 225. Network(s) 225 may include, for instance, any wired and/or wireless network(s) such as cellular network(s), personal area network(s), local area network(s), wide area network(s), internetwork(s), the Internet, cable network(s), public switched telephone network(s), broadcast network(s) (terrestrial, satellite, etc.), two-way radio network(s), etc., or any combination of the above.

Figure 3:
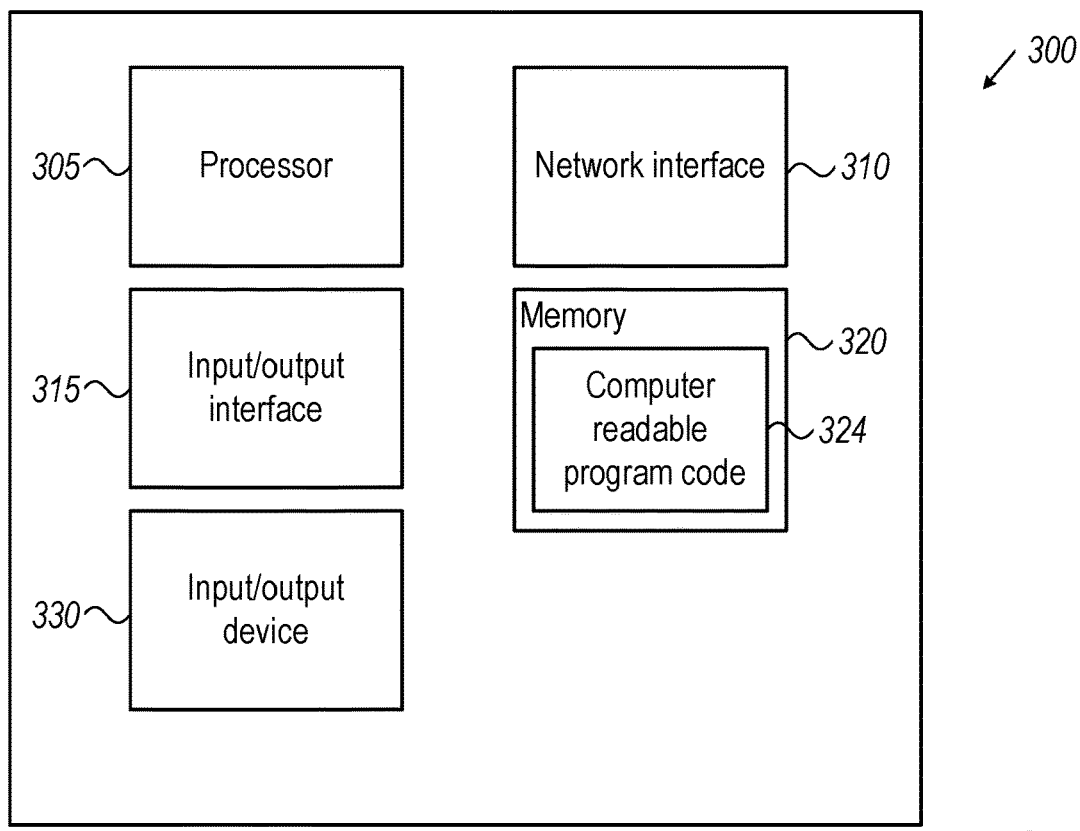
FIG. 3 is a block diagram of a user device, in accordance with some embodiments of the presently disclosed subject matter.

Reference is now made to FIG. 3 which is a block diagram of a user device 300, in accordance with some embodiments of the presently disclosed subject matter. User device 300 may represent any user device 220, e.g. in various implementations user device 300 may represent any one of user devices 220A-220C of FIG. 2. In the illustrated embodiments, user device 300 may include processing capabilities by including at least one processor 305. User device 300 may include any of the following: at least one memory 320, at least one network interface 310, and/or at least one input and/or output interface 315. For simplicity's sake, each of the above modules will be referred to below in the single form, but a reference to a particular module should be construed as including embodiments with a single particular module and/or embodiments with a plurality of the particular module.

Memory 320, if included, may be internal and/or external to processor 305. Memory 320, if external to processor 305, may be internal to and/or external to user device 300. If memory 320 is external to user device 300, memory 320 may be remote and/or local. Memory 320 may be volatile, non-volatile, for long term storage, and/or for short term storage. In some embodiments, memory 320 may include computer readable program code 324. In some embodiments, memory 320 may additionally or alternatively include data for embodiments of the presently disclosed subject matter and optionally other data.

Data in memory 320, if any, may optionally include data that may be used in and/or may result from embodiments of any of methods 500, 540 and/or 570 described below, such as avatar(s), image(s) which avatar(s) may derive from (e.g.

if not the same as the avatar(s)), and/or data (e.g. which text relating to availability status may be based on) such as calendar data, messaging data, presence data, etc. Optionally, data in memory 320 may include data inputted by the user of the particular user device 220 represented by user device 300, data generated by the particular user device 220 represented by user device 300, data inputted by user(s) of other user device(s) 220, data generated by other user device(s) 220, and/or by server(s) 210, etc.

User device 300 may be associated with the communication application and therefore operation(s) performed due to execution of the communication application may be attributed to user device 300. For example, user device 300 may be associated with the communication application because computer readable program code 324 in memory 320 may include the communication application or a part thereof. As another example, the user device 300 may be associated with the communication application in cases where the communication application is a web application, because the communication application may run in a web browser of user device 300. In such cases, the communication application may not necessarily all reside in memory 320 (e.g. at least part of the communication application may reside on a web server). For instance, one or more of server(s) 210 may function as a web server for such a web application.

Optionally, user device 300 may be associated with what is termed herein "additional computer readable program code" and therefore operations performed due to execution of the additional computer readable program code may be attributed to user device 300. For example, computer readable program code 324 in memory 320 may include at least part of the additional computer readable program code, and/or the additional computer readable code may run in a web browser of user device 300. The additional code, if any, and/or the communication application may be operative to cause performance of any of the embodiments of method(s) of the presently disclosed subject matter or any part thereof, such as any of methods 500, 540 and/or 570 discussed below or any part thereof. Optionally, user device 300 may be associated with what is termed herein "other application(s)" (e.g. computer readable program code 324 in memory 320 may include at least part of the other application(s) and/or the other application(s) may run in a web browser of user device 300). Data of the other application(s) may provide a basis for text relating to availability status. The other application(s) may include, for example, scheduling application(s) and/or other communication application(s), etc. Therefore, operation(s) performed due to execution of the other application(s) may be attributed to user device 300.

Processor 305 may be implemented as any type of processor, such as a load store processor (e.g. central processing unit, graphics processing unit, etc.) a programmable very long instruction word engine, etc. Processor 305 may execute computer readable program code, e.g. stored in memory 320 and/or accessed by way of a web browser, in order to perform operations in accordance with embodiments of the presently disclosed subject matter, and optionally unrelated operations.

Network interface 310, if included, may be operative to send and/or receive communications via one or more networks 225, e.g. to one or more servers 210 associated with the communication application. Additionally or alternatively, network interface 310, if included, may be operative to send and/or receive communications via one or more networks to one or more other user devices 220 associated with the communication application.

Input/output interface 315, if included, may be operative to interface with any type(s) of input/output device(s) 330. For simplicity's sake, module 330 will be referred to below in the single form, but should be construed as including embodiments with a single module 330 and/or embodiments with a plurality of modules 330. For example input/output interface 315 may interface with any type of input device 330 (such as a keyboard, keypad, mouse, microphone etc.), any type of output device 330 (such as a speaker, any type of non-touch screen, etc.) and/or any type of integrated input/output device 330 (such as a touchscreen, etc.).

Input/output device 330 may include any output device or integrated input/output device (e.g. touch screen or non-touch screen) for displaying displays such as displays 100, 600 (FIG. 6), 700 (FIG. 7), 800 (FIG. 8), 900 (FIG. 9), 1000 (FIG. 10), 1200 (FIG. 12) described herein. Input/output device 330 may be embedded in user device 300 (or in other words, built-in) and/or may be separate from user device 300 (e.g. peripheral device) but operatively coupled (e.g. wireless and/or wired) to user device 300. Depending on the type of input device or integrated input/output device included in input/output device 330, input/output device 330 may allow any user input gesture, or combination of user input gestures, such a tap, a double tap, menu selection, double click, mouse-over, keypress, click and drag and/or right click etc., that may be detected and recognized. User input gesture(s) are also referred to herein as "input gesture(s)".

User device 300 may include at least some hardware. In some embodiments, any one of the modules shown in FIG. 3 may be made up of software, hardware, or firmware or of any combination of software, hardware and/or firmware capable of performing the operations(s) attributed to the module in embodiments described herein, or known to conventionally be performed by such a module. It is noted however, that operation(s) attributed to a particular module in some embodiments may in some other embodiments be additionally or alternatively performed by one or more other modules shown in FIG. 3.

In some embodiments, user device 300 may include and/or be operatively coupled to fewer, more and/or different modules than illustrated in FIG. 3. In some embodiments, the functionality of two or more modules illustrated in FIG. 3, or any part thereof, may be combined in one module, and/or the functionality of any one module illustrated in FIG. 3 may be divided among two or more modules.

Various user devices 220 in system 200 (FIG. 2) may be configured similarly or may be configured differently. For example not all user devices 220 in system 200 may necessarily conform to the block diagram of FIG. 3, and even user devices 220 which conform to the block diagram of FIG. 3 may be configured differently. For example, two user devices 220 may be of different types, may have at least some different other application(s) associated with the user device, may have embedded versus separate input/output device(s) 330, etc.

Reference is now made to FIG. 4 which is a block diagram of server 400, in accordance with some embodiments of the presently disclosed subject matter. Server 400 may represent server 210 illustrated in FIG. 2. In the illustrated embodiments, server 400 may include processing capabilities by including at least one processor 405. Server 400 may include any of the following: at least one memory 420, and at least one interface 410 to network(s). Optionally, server 400 may include at least one input and/or output interface, and/or optionally server 400 may include at least one built-in and/or peripheral input/output device. For simplicity's sake, each of the above modules will be referred to below in the single form, but a reference to a particular module should be construed as including embodiments with a single particular module and/or embodiments with a plurality of the particular module.

Processor 405 may be implemented as any type of processor, such as a load store processor (e.g. central processing unit, graphics processing unit, etc.) a programmable very long instruction word engine, etc.

Memory 420, if included, may be internal and/or external to processor 405. Memory 420, if external to processor 405, may be internal to and/or external to server 400 (e.g. on other server(s) 210 than server 400). If memory 420 is external to server 400, memory 420 may be remote and/or local. Memory 420 may be volatile, non-volatile, for long term storage, and/or for short term storage. In some embodiments, memory 420 may include computer readable program code 425 and processor 405 may execute computer readable program code 425 from memory 420 in order to perform operations in accordance with embodiments of the presently disclosed subject matter, and optionally unrelated operations. In some embodiments, memory 420 may additionally or alternatively include data for embodiments of the presently disclosed subject matter and optionally other data.

For example, server 400 may be associated with the communication application and therefore, computer readable program code 425 in memory 420 may include computer readable program code for managing the communication application, e.g. including computer readable code for receiving and/or sending data relating to displays for various users of user devices 220 associated with the communication application. The computer readable program code for managing the communication application may additionally or alternatively include computer readable code for brokering data between various user devices 220 associated with the communication application. Data may be sent and/or received by server 400 on a push and/or pull basis. Optionally, computer readable program code 425 in memory 420 may include what is termed herein "additional computer readable program code". Such additional computer readable program code, if any, and/or the computer readable program code for managing the communication application may be operative to cause performance of any of the embodiments of method(s) of embodiments of the presently disclosed subject matter or any part thereof, such as any of methods 500, 540 and/or 570 discussed below or any part thereof.

In some embodiments where the communication application is a web application, and server 400 is a web server for the web application, computer readable program code 425 in memory 420 may include at least part of the communication application. In some other embodiments where the communication application is a web application, server(s) 210 that are not the particular server 210 represented by server 400 may be web server(s) that include at least part of the communication application.

Optionally, computer readable program code 425 in memory 420 may include computer readable program code for managing other application(s) whose data may provide a basis for text relating to availability status, such as scheduling application(s) and/or other communication application(s), etc. Data in memory 420, may optionally include data that may be used in and/or result from embodiments of any of methods 500, 540 and/or 570 described below, such as avatar(s), image(s) which avatar(s) may derive from (e.g. if not the same as the avatar(s)), and/or data (e.g. which text relating to availability status may be based on) such as calendar data, messaging data, presence data, etc. Optionally, data in memory 420 may include data inputted by various users of user devices 220, data generated by the various user devices 220, data generated by the particular server 210 represented by server 400 and/or data generated by other server(s) 210 (if any), etc. In some embodiments where computer readable program code 425 in memory 420 may include computer readable program code for managing one or more other application that may be web application(s), and server 400 is a web server for such web application(s), computer readable program code 425 in memory 420 may include at least part of the other application(s). In some embodiments where the additional computer readable program code associated with user device(s) 220 is/are web application(s), and server 400 is a web server for such web application(s), computer readable program code 425 in memory 420 may include at least part of such additional computer readable program code.

Network interface 410, if included, may be operative to send and/or receive communications via one or more networks 225 e.g. to one or more other servers 210 associated with the communication application and/or with other application(s) managed by server 210. Additionally or alternatively, network interface 410, if included, may be operative to send and/or receive communications via one or more networks to one or more user devices 220, e.g. associated with the communication application.

Server 400 may include at least some hardware. In some embodiments, any one module 405, 410, and 420 may be made up of software, hardware, or firmware or of any combination of software, hardware and/or firmware capable of performing the operations(s) attributed to the module in embodiments described herein or known to conventionally be performed by such a module. It is noted however, that operation(s) attributed to a particular module in some embodiments may in some other embodiments be additionally or alternatively performed by one or more other modules shown in FIG. 4.

In some embodiments, server 400 may include fewer, more and/or different modules than illustrated in FIG. 4. In some embodiments, the functionality of two or more modules illustrated in FIG. 4, or any part thereof, may be combined in one module, and/or the functionality of any one module illustrated in FIG. 4 may be divided among two or more modules.

If there is more than one server 210 in system 200 of FIG. 2, the various servers 210 may be configured differently or may be configured similarly. For example not all server(s) 210 in system 200 may necessarily conform to the block diagram of FIG. 4, and even server(s) 210 which conform to the block diagram of FIG. 4 may be configured differently.

Referring again to FIG. 2, in some embodiments, any user device 220 and/or server 210 in system 200 may be made up of software, hardware, or firmware or of any combination of software, hardware and/or firmware capable of performing the operation(s) attributed to the user device or server herein in those embodiments. It is noted that operation(s) attributed in some embodiments to a particular user device 220, may in some other embodiments be performed by one or more other user devices 220 and/or by server(s) 210. Similarly, operation(s) attributed in some embodiments to a particular server 220, may in some other embodiments be performed by one or more user devices 220 and/or by other server(s) 210.

Having described system 200, method(s) relating to an avatar, such as avatar 160 of FIG. 1, will now be described.

Reference is made to FIG. 5 which is a flowchart of a generalized method 500, in accordance with some embodiments of the presently disclosed subject matter. Method 500 may be performed, for example, by user device 220 (e.g. 220A) that is associated with the user represented by the avatar (e.g. Marcellos as shown in FIG. 1). Additionally or alternatively, method 500 may be performed by one or more of server(s) 210, collectively or individually. Additionally or alternatively, method 500 may be performed by one or more other user devices 220 associated with other user(s), e.g. to which the avatar representing the user is to be displayed (say user device 220B associated with Keith). Additionally or alternatively, method 500 may be performed collectively by any of: user device 220 associated with the user represented by the avatar, server(s) 210, and/or user device(s) 220 associated with other user(s) to which the avatar is to be displayed. The stages of method 500 are presented here in brief, but will be expanded upon further below when describing particular embodiments.

In the illustrated embodiments in stage 520, an image may be obtained including one or more characters that relate to an availability status of a user of the communication application (e.g. Marcellos). The one or more characters may be selected or may have been selected based on a text that was provided, relating to the availability status of the user, and/or based on a lack of any text relating to alternative availability status of the user. As mentioned above, even if the characters are selected based on a text, the characters may not necessarily have been from the text, representative of the entire text, and/or limited only to the text.

How the image may be obtained may vary depending on the example, but for the sake of further illustration to the reader, some examples are now provided.

For example, obtaining the image in stage 520 may include receiving the image that includes the one or more characters relating to the availability status of the user of the communication application. For instance the image may be received from one of user devices 220 and/or from one of server(s) 210.

As another example, obtaining the image in stage 520 may additionally or alternatively include retrieving the image and/or generating the image that includes the one or more characters relating to the availability status of the user of the communication application. In some implementations prior to performing the retrieval or generation, stage 510 may be performed, namely determining that a current avatar is to be changed or that an initial avatar for the user is to be created. The current avatar may, for example, be the avatar that would be used to represent the user in at least one display of the communication application to at least one other user, if stages 520 and 530 were not taking place, and/or for example the avatar that most recently was used to represent the user in at least one display of the communication application to at least one other user. It is noted that the communication application may have a plurality of other users in addition to the user represented by the avatar, and that the at least one other user may be at least one of the plurality of other users. In the cases where a determination is made that a current avatar is to be changed or an that initial avatar for the user is to be created, how the determination may be made may vary depending on the instance, but for the sake of further illustration to the reader some instances are now provided.

An initial avatar representing a user in at least one display of a communication application to at least one other user may be the first-ever avatar that represents that user in any display of the communication application. Creation of an initial avatar to represent the user in display(s) of the communication application may occur at any appropriate time, such as the first time the user logs in to the communication application, or at any time afterwards.

For instance the determination that a current avatar is to be changed or that an initial avatar is to be created for the user in stage 510 may include receiving an indication that the current avatar is to be changed or an initial avatar created (e.g. receiving such an indication from the user, from any of the plurality of other users of the communication application, or from any user device 220 or server 210 that is not performing the presently described iteration of method 500). An indication that the current avatar is to be changed or an initial avatar is to be created, for example, may be triggered by user input gesture(s) with respect to the current avatar that is to be changed, with respect to an image/avatar that may be retrieved, with respect to a menu option to create an initial avatar, etc. Additionally or alternatively for instance, the determination may include receiving an indication relating to the availability status, such as data (e.g. presence data, messaging data, calendar data, etc.) and/or a text relating to the availability status and/or receiving an indication that there is no data (e.g. presence data, messaging data, calendar data, etc.) or text relating to alternative availability status. Such indication(s) may be received, for example, from the user, from any of the plurality of other users of the communication application, or from any user device 220 or server 210 that is not performing the presently described iteration of method 500.

Additionally or alternatively for instance, the determination in stage 510 may include determining the availability status of the user, e.g. based on data (e.g. presence data, messaging data, calendar data, etc.) and/or a text relating to the availability status and/or based on there not being data (e.g. presence data, messaging data, calendar data, etc.) or text relating to alternative availability status. Additionally or alternatively for instance, the determination in stage 510 may include determining that the availability status of a user has changed or will be changing (e.g. from a text relating to the availability status, lack of a text relating to alternative availability status, and/or by determining that calendar data, messaging data and/or presence data, etc. has been altered). Additionally or alternatively for instance, the determination may include determining an (initial) availability status for the user (e.g. from a text relating to the availability status and/or lack of text relating to alternative availability status).

A text relating to the availability status may include for example a text from the user (or from any of the plurality of other users), and/or a text that is based on message data (e.g. out of office message which may be activated), calendar data, and/or presence data, etc. A text relating to the availability status may or may not be a text that also related to the availability status that has changed or will be changing. For example the text relating to the availability status that has changed or will be changing may have included a time that the (changing) availability status was to expire (e.g. a return date from an out of office message, if the availability status is changing from out of office to in-office, or a date entered by a user), and therefore may also relate to the (changed) availability status. Assuming the (changed) availability status is "in-office" or similar, a lack of text may occur, for example, if an earlier out of office message (relating to the changing out of office availability status) was deactivated.

Additionally or alternatively, the determination in stage 510 may include a determination that the current avatar has timed out. In some cases, after a prolonged usage of an avatar (e.g. of a non-default avatar), the avatar may time out and, say, a default avatar (e.g. indicative of a default availability status) may be used to represent the user. For instance, if an avatar indicative of the user being in a meeting, persists for an unrealistic amount of time for that availability status (e.g. more than a work day for a meeting), then the avatar may time out, as it may be assumed that there was a glitch which prevented a determination that the avatar is to be changed.

In cases where stage 510 of determining that the current avatar is to be changed or an initial avatar created is performed, the timing of such a determination, and/or whether such a determination may be reactive and/or proactive, may possibly vary. For example, the determination may be proactive (e.g. pulling—requesting so as to receive indications, and/or determining that the availability status has changed or will be changing, an initial availability status and/or whether the current avatar has timed out). Additionally or alternatively, for example, the determination may be reactive (e.g. pushed-waiting to receive indications). As another example the timing of the determination may in some instances be configurable, e.g. to be periodic or event driven, whereas in other instances the determination may not be configurable.

In cases where stage 510 is performed, obtaining stage 520 may or may not occur soon after determining stage 510. For instance if the changed or initial avatar is required soon after the determining, then the obtaining may occur soon after the determining, but if the changed or initial avatar is only required later, then the obtaining may or may not be postponed to later. In other cases, no determination stage 510 may be performed.

Referring now to the example where obtaining the image in stage 520 may include retrieving the image that includes the one or more characters relating to the availability status of the user of the communication application, the retrieved image may for instance be an image that was used before in the communication application, that was used before in another communication application, and/or that was generated before for any purpose. Assuming that the image was used before in the communication application, in some cases the image that is retrieved may be a previous avatar that represented the user, or an image which a previous avatar that represented the user derived from. A previous avatar may be any avatar that represented the user prior to the current avatar. Such a retrieval may occur, e.g. if it was determined that the availability status of the user has reverted to the availability status of the user that was effective at a time that the previous avatar represented the user, or e.g. if the user or any of the plurality of other users indicates that the current avatar is to be changed, say, by using a user input gesture to select the previous avatar or image which the previous avatar derived from.

Continuing with the instance, it may be possible that the current avatar is used when the user was "on vacation" or "out" (or conversely not "on vacation" or "in") and the previous avatar was used when the user was not "on vacation" or "in" (or conversely "on vacation" or "out"). In this instance, the image may be retrieved once it is determined that the user is or will be again not "on vacation" or "in" (or conversely "on vacation" or "out"), for instance based on an out of office message. Possibly, the characters in the retrieved image may include character(s) that were selected based on a text that was provided when the retrieved image was generated, and/or characters that were selected based on a lack of any text relating to alternative availability status when the retrieved image was generated.

Referring now to the example where obtaining the image in stage 520 may include generating the image that includes the one or more characters relating to the availability status of the user of the communication application. In some cases prior to generating the image, another stage may be performed, namely providing a text relating to availability status. If both a stage of provision of a text and stage 510 of determination that a current avatar is to be changed (or that an initial avatar for the user is to be created) are performed, the provision stage may be a separate stage or may be a sub-stage of determination stage 510. In such cases, how the text may be provided may vary depending on the instance, but for the sake of further illustration to the reader, some instances are now provided. For instance, the text may be provided from the user to be represented by the avatar, from any of the plurality of other users, may be provided automatically, and/or may be provided semi-automatically.

Examples of automatic or semiautomatic provision of text may include text provided by the communication application and/or by computer readable program code for managing the communication application; and/or text provided by any other computer readable program code (e.g. where the any other computer readable program code may possibly include the additional computer readable program code, the other application(s), and/or the computer readable program code for managing other application(s) mentioned above). For example, the communication application, the computer readable program code for managing the communication application and/or any other computer readable program code may provide text based on available data such as calendar data, presence data (e.g. relating to a presence based communication application) and/or messaging data (e.g. out of office message), etc. Cases may be assumed where the text may be provided by the communication application and/or the computer readable program code for managing the communication application; by way of any other computer readable program code; and/or that is based on available data. In such cases, the communication application, the computer readable program code for managing the communication application, the any other computer readable program code and/or the available data, may be associated with user device 220 that may be performing the presently described iteration of method 500; may be included in server(s) 210 that may be performing the presently described iteration of method 500; may be associated with one or more other user devices 220 that may not be performing the presently described iteration of method 500; and/or may be included in server(s) 210 that may not be performing the presently described iteration of method 500. In other cases, a text may not be provided.

In the example of generating the image, how the image may be generated may vary depending on the instance, but for the sake of further illustration to the reader, some instances are now provided.

For instance, generating the image may include generating an image that includes only the one or more characters. In another instance, generating the image may include making an image (e.g. that was received, retrieved and/or previously generated), that includes the one or more characters, look different.

In another instance, generating the image may include creating an overlay image that includes the one or more characters and merging the overlay image with the current avatar or with an image which the current avatar derived from. In another instance, generating the image may include merging an overlay image (e.g. dark with a level of transparency), the one or more characters, and the current avatar or an image which the current avatar derived from. In another instance, generating the image may include overlaying the one or more characters over the current avatar or over an image which the current avatar derived from. In another instance, where the current avatar included character(s) relating to the availability status that has changed or will be changing, generating the image may include removing some or all of the character(s) relating to the changing availability status from the current avatar or image which the current avatar derived from prior to performing the overlaying or merging. In the latter instance, not necessarily all of the character(s) relating to the changing availability status may have to be removed, for instance if part of the character(s) relating to the changing availability status are also included in the one or more characters.

In another instance, generating the image may include creating an overlay image that includes the one or more characters and merging the overlay image with another image (e.g. that is not the same as the current avatar or image which the current avatar derived from). In another instance, generating the image may include merging an overlay image (e.g. dark with a level of transparency), the one or more characters, and another image (e.g. that is not the same as the current avatar or image which the current avatar derived from). In another instance, generating the image may include overlaying the one or more characters over another image (e.g. that is not the same as the current avatar or image which the current avatar derived from). In another instance, for an initial avatar, generating the image may include creating an overlay image that includes the one or more characters and merging the overlay image over another image. In another instance, for an initial avatar, generating the image may include merging an overlay image (e.g. dark with a level of transparency), the one or more characters, and another image. In another instance, for an initial avatar, generating the image may include overlaying the one or more characters over another image. In some cases, the other image may be selected based on the availability status of the user.

It may be possible that different user device(s) 220 and/or server(s) 210 may perform different executions of method 500 for the same avatar, and the obtaining may vary depending on which user device 220 or server 210 is performing the execution. For example, a particular user device 220 or server 210 may obtain the image by generating or retrieving the image, whereas one or more other user devices 220 and/or server(s) 210 may obtain the image by receiving the (generated or retrieved) image.

The image that may be obtained may be the avatar which will represent the user in display(s) of the communication application, or may be an image from which the avatar will derive (or equivalently from which the avatar will result). When referring herein to an avatar resulting from (or deriving from) an image, it should be understood that the avatar may derive directly from the image or may derive from the image via a chain of one or more other images which may derive from the image. It may be possible that in certain execution(s) of method 500 for the same avatar, the image that is referred to as being obtained may be the avatar, whereas in certain other execution(s) the image that is referred to as being obtained may be the image from which the avatar may derive.

An avatar that derives from an image may vary from the image, in any appropriate manner. However for the sake of further illustration to the reader, some examples are now provided of possible variations. For example, the avatar may include the same one or more characters as does the image, but the character(s) may look dissimilar in the avatar e.g. in terms of font, size, level of transparency/translucency, positioning, direction, and/or fully versus not fully formed, etc. As another example, one or more elements that are not the one or more characters, such as pictorial element(s), if included, may not be the same in the avatar as in the image. As another example, the boundaries of the avatar may not be the same as the boundaries of the image. Continuing with the example, the image may be "cropped" or resized so as to fit the boundaries allocated to an avatar in a display of the communication application. As another example, the image may be reformatted or bordered. Although not necessarily so, in some cases, deriving the avatar from an image may include applying such variations(s) to the image and/or to one or more other images from a chain of other image(s) derived from the image, if any.

In some embodiments, the avatar that is the image or derives from the image may be characterized as an initial avatar or a changed avatar (e.g. replacement avatar for the current avatar, or the current avatar made different). In some embodiments, the avatar may be characterized as a default avatar or a non-default avatar. As mentioned above, a default avatar may be an avatar that is indicative of a default availability status. For instance, the availability status of online, available, in-office, or similar may in some cases be considered the default availability status, whereas in other cases the availability status of offline, out of office, or similar may be considered the default availability status. In such embodiments, an image which is obtained (e.g. by way of receiving, retrieving and/or generating) may be a default or non-default avatar, or a default or non-default avatar may derive from the obtained image. In some of such embodiments, it may be more likely that a retrieved image be a default avatar or that a default avatar derive therefrom, rather than being a non-default avatar or that a non-default avatar derive therefrom, but in some other embodiments, it may not necessarily be more likely. In some embodiments, a default avatar may be caused to represent a user in display(s) if there is reason to suspect that the current avatar of the user is not accurate (e.g. has timed out), but in some other embodiments, a default avatar may not be caused to represent a user in display(s) if there is reason to suspect that the current avatar of the user is not accurate (e.g. has timed out).

In the illustrated embodiments, method 500 may further include stage 530: causing an avatar, that includes the one or more characters and that is the image or derives from the image, to represent the user (e.g. Marcellos) in one or more displays of the communication application to one or more other users of the communication application (e.g. including Keith). As mentioned above, a plurality of other users may use the communication application in addition to the user. The one or more other users may, for instance, be one or more of the plurality of other users that use the communication application in addition to the user. The avatar may thus act for the one or more other users as a visual indicator of the availability status of the user. See for example display 100 (FIG. 1) above associated with Keith, where avatar 160 representing "Marcellos" is indicative of Marcellos being on PTO. The image file format of the avatar may vary depending on the embodiment. For instance, the image file format may include portable network graphics ("PNG") format, Joint Photographic Experts Group ("JPEG") format, and/or in any other image file format that may be suitable. Various examples regarding causing will be described in the following paragraphs.

Optionally the avatar may also be caused to represent the user in one or more displays of the communication application to the user. In such cases, the user may also view the avatar representing him or herself in display(s) thereof.

However, if the user is not using the communication application while characterized by the availability status (e.g. due to being on vacation), the user may not be viewing displays and therefore the avatar may not be shown to the user.

The term caused is used herein, in the context of causing the avatar to represent the user in display(s) of the communication application to other user(s), in order to cover embodiments where the causing includes displaying the avatar to other user(s), and embodiments where the causing does not include displaying the avatar to other user(s). For example, in some embodiments a particular user device 220 or server 210 performing a particular execution of method 500 may not include an input/output device to display the display(s) that include an avatar representing a user to another user; whereas in other embodiments, a particular user device 220 performing the particular execution may have an input/output device (e.g. 330) embedded within to display such display(s) to the other user. It is noted that even if a particular execution of method 500 is performed by a particular user device 220 which is associated with one of the one or more other users, the particular user device 220 may not necessarily include an input/output device to display the display(s) that include the avatar representing the user.

How the causing may take place, and the timing of the causing may vary depending on the embodiment, the characteristics of the communication application, which user device(s) 220 and/or server(s) 210 may be performing the particular execution of method 500, etc. However for the sake of further illustration to the reader some examples are now described.

For example, the causing may include transmitting the image after the image is obtained, transmitting the avatar (e.g. if not the same as the image), deriving the avatar from the image (e.g. if avatar not the same as the image), providing the avatar for display in display(s), displaying the avatar in display(s), etc. It may therefore be understood that it may be possible that different user device(s) 220 and/or server(s) 210 may perform different executions of method 500 for the same avatar, and the causing may vary depending on which user device 220 or server 210 is performing the execution.

For instance, a certain user device 220, associated with the user represented by the avatar, which generates or retrieves an image and thus fulfills stage 520 of obtaining an image may cause an avatar that is the image or derives from the image to represent the user in one or more displays to one or more other users (and thus fulfill stage 530) by optionally deriving the avatar from the image, and by transmitting the avatar and/or the image (e.g. if avatar not the same as the image) to server(s) 210 and/or to user device(s) associated with the other user(s).

Continuing with the instance, server 210 which receives the avatar and/or the image (e.g. if avatar not the same as the image) and thereby fulfills stage 520 of obtaining an image, may cause the avatar to represent the user and thereby fulfill stage 530, by optionally deriving the avatar from the image, and by transmitting the avatar and/or the image (e.g. if avatar not the same as the image) to user device(s) associated with the other user(s). Still continuing with the instance, a particular user device 220 associated with another user which receives the avatar and/or the image (e.g. if the avatar not same as the image) and thereby fulfills stage 520 of obtaining an image, may cause the avatar to represent the user and thereby fulfill stage 530, by optionally deriving the avatar from the image, by providing the avatar for display in display(s) (e.g. on an embedded screen, or on a peripheral screen if particular user device 220 does not include an input/output device capable of displaying the display) and by optionally displaying the avatar in display(s) (e.g. if particular user device 220 includes a screen). It should be evident that such an instance is only one possible instance of different executions of method 500 for the same avatar and the subject matter is not bound by such an instance. For example, in another instance, server 210 or particular user device 220 associated with the other user may obtain the image by generating or retrieving the image, rather than by receiving the avatar and/or the image.

Continuing with describing examples relating to causing, but focusing more on the timing of the causing, stage 530, for example, may or may not be performed soon after stage 520. For instance, if the avatar is only supposed to be displayed after a certain time period has elapsed from stage 520, then stage 530 may possibly be performed closer to the end of the time period. Additionally or alternatively, in such an instance stage 530 may be performed soon after stage 520, but a start of validity time that is dependent on the time period may be associated with the avatar, so that the avatar may only be displayed after the start of validity time has passed.

For example, additionally or alternatively, a changed avatar or initial avatar representing a user (e.g. Marcellos) who is associated with a particular user device 220 (e.g. user device 220A assumed to be associated with Marcellos) may be displayed to other user(s) in respective displays thereof (e.g. in display 100 associated with Keith), at a minimum delay that may be dependent on the characteristics of the communication application.

For instance, assume that the communication application is protocol based or equivalently presence based. Jabber® is an example of a communication application that is presence based. In accordance with some embodiments in such a communication application, a changed or initial avatar representing a particular user (e.g. Marcellos) may be displayed to other user(s) in real time (e.g. in less than 250 milliseconds from the time that the current avatar was changed or the initial avatar was created). In some cases, the particular user device 220 (e.g. 220A from FIG. 2) associated with the particular user may package the (changed or initial) avatar, the image which the avatar derives from (e.g. if not the same), an indication relating to the availability status (e.g. a text relating to availability status and/or indication of lack of any other text relating to alternative availability status) and/or any other data (e.g. indication that the avatar is to be changed or initially created). Following a protocol described by XMPP (eXtensible Messaging and Presence Protocol), user device 220A may then send the package over a socket to server(s) 210 (e.g. cups—Cisco Unified Presence Servers) responsible for managing the communication application.

Additionally or alternatively, in some cases, in the presence based communication application, server(s) 210 may determine that an (current) avatar has timed out and therefore is to be changed. Server(s) 210 may also or instead determine that the availability status of the user has changed or will be changing, or may determine an initial availability status for the user. For example, the determination may be made based on a text relating to the availability status that may be available internally (e.g. in any of server(s) 210), due to lack of any other text relating to alternative availability status being available internally and/or based on alteration of internal messaging data, calendar data and/or presence data, etc. In some embodiments where server 210 has access to a text relating to the availability status and/or is aware that there is a lack of text relating to alternative availability status but did not receive a (changed or initial) avatar, nor the image from which such an avatar will derive (e.g. if not the same) in the package, server 210 may use the text or the fact that there is a lack of text when generating an image.

Continuing with describing the instance of a presence based communication application, server 210 may optionally save the avatar of the particular user and/or the image which the avatar derives from (e.g. in memory 420), and may identify which other user(s) may require the avatar in display(s) thereof. The avatar may be required, e.g., by other users whose displays would otherwise show the "current" avatar that represented the particular user before the change or would not display any avatar for the particular user. Such other users may include, e.g. users participating in conversations with the particular user, users having the particular user as a contact, etc. Server 210 may then send the avatar and/or the image which the avatar derives from (e.g. if not the same) to user devices 220 associated with the other users (e.g. including user device 220B associated with Keith) so that the avatar may be displayed to the other users in displays of the communication application (e.g. see above display 100 associated with Keith).

In another instance, the communication application may not be presence based. Cisco Spark® is an example of a non-presence based communication application. In such an application the (changed or initial) avatar of a particular user may be displayed to other users after a longer delay, such as within seconds, from the time that the current avatar was changed or the initial avatar created. Consider one example of a non-presence based communication application. In the example, the changed or initial avatar of a particular user (e.g. Marcellos), and/or the image which the avatar derives from (e.g. if not the same), may be transmitted by server 210 to user device 220 (e.g. user device 220B) of another user (e.g. Keith) which requires the avatar (e.g. to user device 220B which requires the avatar). The transmission may occur when user device 220B of the other user is refreshing a display for the other user or generating a new display for the other user. For instance, the refreshing may occur after user device 220B polls server 210 for any updates for the display(s).

It is noted that the nature of the availability status information that is to be conveyed by the avatar may in some embodiments influence whether or not a shorter delay makes a difference, and/or whether or not the typically larger number of servers 210 for a presence based communication application is a worthwhile usage of resources. For example, as "on vacation" is usually an availability status of a user for at least a half a day, a delay of a few milliseconds versus a delay of seconds or even minutes may not necessarily matter to the other user(s) that view the avatar. Therefore, depending on whether or not the availability status that is visually indicated by the avatar does or does not persist for say at least more than a few minutes, a non-presence based communication application may or may not adequately allow the avatar to act as a visual indicator of the availability status. In some embodiments, it may be advantageous when an avatar acts as a visual indicator of availability status in display(s) of a non-presence based communication application, thus saving resources compared to when an avatar or any other indicator of availability status is used in a presence based communication application.

Although in some of the instances described above regarding presence and non-presence based communication applications, server 210 is described as transmitting the avatar and/or the image from which the avatar derives (e.g. if not the same) to user device(s) associated with user(s) that require the avatar, the subject matter is not so limited, and server 210 may in some embodiments transmit the avatar and/or image to user device(s) 220 associated with any users of the communication application, including to the user represented by the avatar, other user(s) which may require the avatar, and/or other user(s) which may not require the avatar.

Additionally or alternatively, the manner in which user device(s) 220 may communicate with server(s) 210, server(s) 210 may communicate with user device(s) 220, servers 210 (if there is more than one) may communicate with one another, and/or user devices 220 may communicate with one another, may vary depending on the embodiment. Additionally or alternatively, although in some of the examples described above with respect to method 500, specific function(s) may have been attributed to user device 220A of the user represented by the avatar, specific function(s) to server(s) 210 and/or specific function(s) to user device(s) 220 of other users, the subject matter is not bound by the described attributions.

Depending on the embodiment, there may or may not be additional stages to method 500 after stage 530. Some embodiments of possible additional stage(s) will now be described.

For example, in accordance with some embodiments of the presently disclosed subject matter, additional stages to method 500 may include saving the avatar or the image in memory. For example the avatar or image may be saved in memory (e.g. 320) of any user device(s) 220 associated with the user represented by the avatar, in memory (e.g. 320) of any other user device(s) 220 associated with any other user(s) and/or in memory (e.g. 420) of any server(s) 210.

The description of embodiments of method 500 specified that the avatar included character(s) relating to the availability status, but did not specify whether the immediately preceding avatar that represented the user (what is termed herein "current avatar") included or excluded characters relating to the availability status. Similarly a "next avatar" to represent the user may or may not include characters relating to availability status. The two options will now be described.

In accordance with some embodiments of the presently disclosed subject matter after stage 530, an image (referred to herein for clarity's sake as "second image") may be obtained without (or in other words excluding) characters relating to availability status of the user. In some of such embodiments, an image without characters relating to availability status of the user may be considered indicative of another availability status (e.g. a default availability status). A next avatar may be without characters relating to availability status and therefore indicative of the other availability status. The next avatar that is the second image or derives from the second image may be caused to represent the user in at least one display of the communication application to the one or more other users. The next avatar may thus act for the one or more other users as a visual indicator of the other availability status of the user. The stages may be performed similarly to any of stages 510 to 530 described above, and therefore the reader is referred above, mutatis mutandis. For instance, if obtaining the second image includes generation of the second image by using the image or avatar relating to the availability status described in stage 520 above (e.g. rather than including retrieving an image that is the second avatar or from which the second avatar derives), the generation of the second image may include removing character(s) relating to the availability status from the image or avatar prior to performing the merging or overlaying.

In accordance with some other embodiments of the presently disclosed subject matter, after stage 530 is performed, any of stages 510 to 530 may be repeated. Although it may be possible to repeat any of stages 510 to 530 for the same availability status, for simplicity of description it is assumed that the repetition is for another availability status. In the presently described iteration, the image that is obtained (referred to herein for clarity's sake as "third image") may include at least one character relating to the other availability status. Since the other availability status is a different availability status than the availability status of the earlier iteration, the at least one character may not all be identical to the one or more other characters (included in the image of the earlier iteration of stage 520). In the presently described iteration of stage 530, a next avatar, that includes the character(s) relating to the other availability status, and that is the third image or derives from the third image, may be caused to represent the user, in at least one display of the communication application to the one or more other users. The next avatar may thus act for the one or more other users as a visual indicator of the other availability status of the user. The references to "second" and "third" images, are used above for clarity purposes only, in order to distinguish the images from the image mentioned in the description above of the earlier iteration of stages 520 and 530.

Figure 5A:
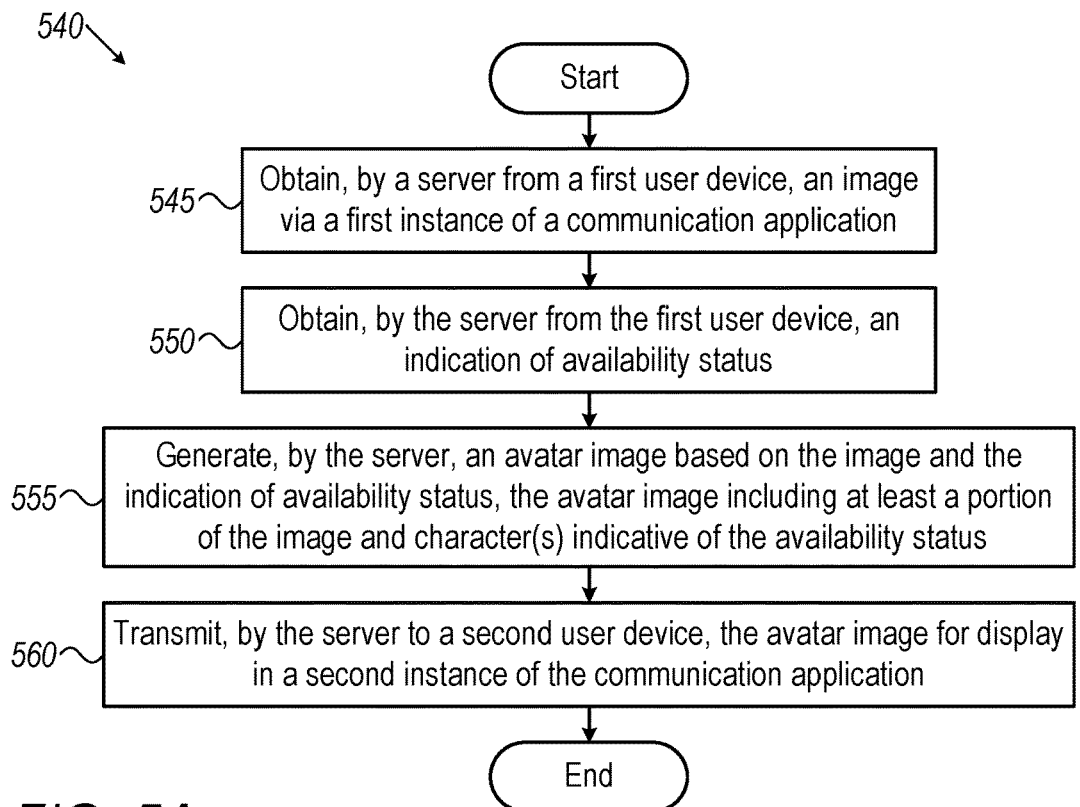
FIG. 5A is a flowchart of another generalized method, in accordance with some embodiments of the presently disclosed subject matter.

FIG. 5A is a flowchart of another generalized method 540, in accordance with some embodiments of the presently disclosed subject matter.

Method 540 may be executed by server 210. In some cases, the operations of server 210 may implement both method 540 and method 500, whereas in other cases, the operations of server 210 may implement the stages of one of methods 540 or 500.

In the illustrated embodiments, in stage 545, server 210 may obtain from a first user device 220 (e.g. user device 220A assumed to be associated with Marcellos) an image via a communication application (e.g. via a first instance of the communication application). For instance, server 210 may receive the image from first user device 220.

In the illustrated embodiments, in stage 550, server 210 may obtain from first user device 220, an indication of availability status (also referred to herein as an indication relating to availability status). For instance, server 210 may receive an indication of availability status that includes data such as presence data, messaging data and/or calendar data, etc., via the communication application, via another communication application, and/or via another application that is not a communication application. Additionally or alternatively, server 210 may receive an indication of availability status that includes character(s) provided by the user of first user device 220, e.g. by way of a text from the user that includes the character(s).

In the illustrated embodiments, in stage 555, server 210 may generate an avatar image (also referred to herein simply as an avatar) based on the image and the indication of availability status. The avatar image may include at least a portion of the image and one or more characters indicative of the availability status. For example, the image may be cropped, resized, reformatted, bordered, etc. The character(s) may be generated by server 210, for instance in response to the indication of availability status being indicative of a generic "away" status, or similar. Additionally or alternatively for instance, the character(s) may be received as the indication of availability status, such as when the characters are provided by the user (e.g. included in a text from the user).

In the illustrated embodiments, in stage 560, server 210 may transmit to a second user device 220 (e.g. user device 220B assumed to be associated with Keith), the avatar image for display in the communication application (e.g. in a second instance of the communication application). Method 540 then ends.

Figure 5B:
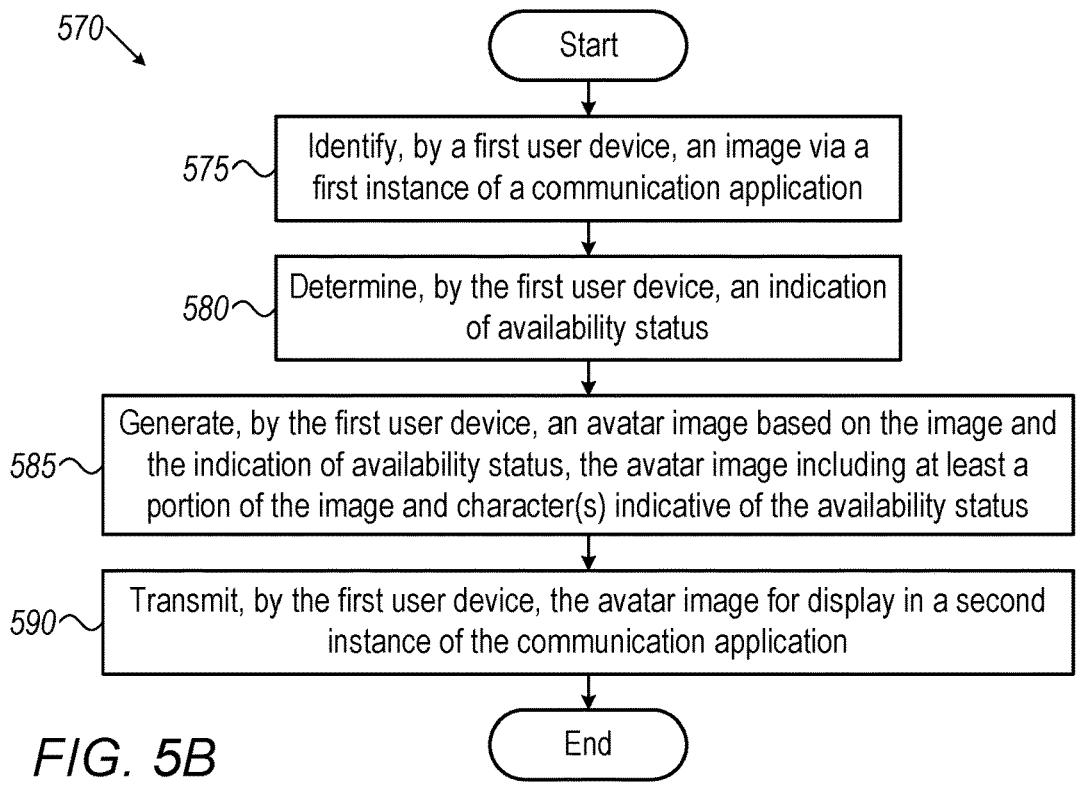
FIG. 5B is a flowchart of another generalized method, in accordance with some embodiments of the presently disclosed subject matter.

FIG. 5B is a flowchart of another generalized method 570, in accordance with some embodiments of the presently disclosed subject matter.

Method 570 may be executed by a first user device 220 associated with a user represented by an avatar (e.g. user device 220A assumed to be associated with Marcellos). In some cases, the operations of first user device 220 may implement both methods 570 and method 500, whereas in other cases, the operations of first user device 220 may implement the stages of one of methods 570 or 500.

In the illustrated embodiments, in stage 575, first user device 220 may identify an image via a communication application (e.g. a first instance of a communication application). For instance, first user device 220 may identify an image by way of the user selecting the image, such as selecting the current avatar image or another image.

In the illustrated embodiments, in stage 580, first user device 220 may determine an indication of availability status. For example, the indication of availability status may be determined based on data (e.g. presence data, messaging data, calendar data, etc.) generated by the communication application, by another communication application, and/or by another application that is not a communication application. Additionally or alternatively, the indication of availability status may be determined based on character(s) provided by the user of first user device 220, e.g. by way of a text from the user that includes the character(s).

In the illustrated embodiments, in stage 585, first user device 220 may generate an avatar image based on the image and the indication of availability status. The avatar image may include at least a portion of the image and one or more characters indicative of the availability status. For example, the image may be cropped, resized, reformatted, bordered, etc. The character(s) may be generated by first user device 220, for instance in response to the indication of availability status being a generic "away" status, or similar. Additionally or alternatively for instance, the characters may be received as the indication of availability status, such as when the characters are provided by the user (e.g. included in a text from the user).

In the illustrated embodiments, in stage 590, first user device 220 may transmit the avatar image for display in the communication application (e.g. in a second instance of the communication application). The avatar image may be transmitted, for instance, to server 210, or directly to a second user device 220 (e.g. user device 220B assumed to be associated with Keith) executing the second instance of the communication application. Method 570 then ends.

The references to "first" and "second" in the description of methods 540 and 570 above are used for clarity purposes only.

In some embodiments, stage(s) shown in any of FIGS. 5, 5A, and/or 5B may be performed in a different order than shown, and/or two or more stages may be performed simultaneously. Additionally or alternatively, in some embodiments, any of methods 500, 540, and/or 570 may include fewer, more and/or different stages than illustrated in FIGS. 5, 5A, and/or 5B respectively.

More details on possible embodiments relating to methods 500, 540 and/or 570 will now be described with reference to FIGS. 6-9, where a text relating to availability status is provided from the user represented by the avatar.

Figure 6:
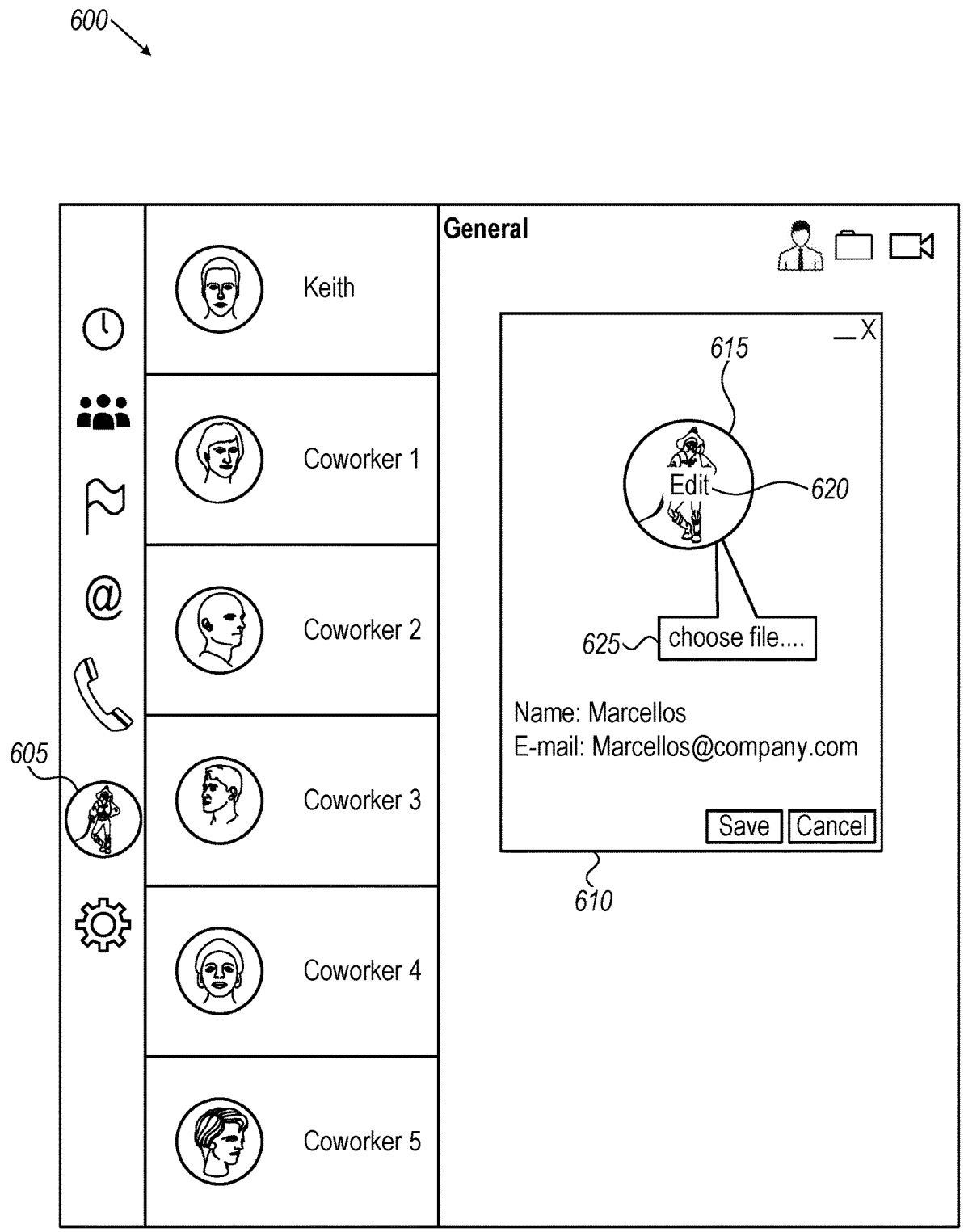
FIG. 6 is a simplified pictorial illustration of an exemplary communication application display, constructed and operative in accordance with some embodiments of the presently disclosed subject matter.

Refer to FIG. 6 which is a simplified pictorial illustration of an exemplary communication application display 600, constructed and operative in accordance with some embodiments of the presently disclosed subject matter. Display 600 may represent an application display for a collaboration application, such as Cisco Spark® that supports conversations among multiple users. It will be appreciated that the embodiments described herein may be implemented within the context of any other communication application, such as, for example, Microsoft Outlook®, Jabber®, Facebook® or WhatsApp®.

Display 600 may be associated with the user Marcellos, when avatar 605 representing Marcellos is not (yet) indicative that Marcellos is on PTO. For simplicity's sake, it is assumed that Keith and Marcellos are coworkers and therefore the same coworkers 1 to 5 are displayed on the left in display 600 as in display 100. Display 600 may be displayed on a screen (e.g. input/output device 330) embedded in or operatively coupled to user device 220 (e.g. 220A) associated with Marcellos.

The user Marcellos may provide a first part of an indication that the current avatar is to be changed, for instance by using a user input gesture (e.g. clicking with a mouse or tapping) on avatar 605. The communication application, associated with user device 220A that is associated with Marcellos, may therefore cause a sub-display 610 to be displayed, e.g. instead of at least part of display 600, or in addition to display 600. Sub-display 610 is shown in FIG. 6 covering part of display 600 and including an avatar 615 representing Marcellos that is an enlarged version of avatar 605. By using a user input gesture such as clicking on avatar 615 with a mouse, or tapping, e.g. on the word "Edit" 620 or on any otherwise specified location, the user may provide a second part of an indication that the current avatar is to be changed. The communication application associated with user device 220A, may therefore invoke a graphics editor application. For example, the graphics editor application may be included in the additional computer readable program code associated with user device 220A that is associated with Marcellos. The additional computer readable program code and/or the communication application associated with user device 220A, may cause user device 220A to perform method 500 and/or method 570. Due to the graphics editor application, for instance, one or more graphics editor displays (e.g. 700, 800, 900 described below) may be displayed on a screen (e.g. input/output device 330) embedded in or operatively coupled to user device 220A. The graphics editor display(s) may be displayed instead of at least part of display 600, e.g. covering at least part of display 600, or may be displayed in addition to display 600.

Before describing examples of graphics editor displays, reference is made to sub-display 610 shown in FIG. 6. Sub-display 610 shows an option of changing avatar 615 by choosing a file with one or more different pictorial elements than currently in avatar 615. For example, "Marcellos" may use a user input gesture such as clicking or tapping on "choose file" 625, and browse for a file that includes pictorial element(s) to be used in the changed avatar. The file that includes pictorial element(s) to be used in the changed avatar may then be selected by user input gesture, e.g. by double clicking or double tapping on the file name. The substitution of pictorial element(s) may be done prior to invoking the graphics editor, or may be done within the graphics editor application as will be described in more detail below. If only the latter option is available, the "choose file" option 625 may be omitted from sub-display 610. In some cases, the user may select the pictorial element(s) based on availability status. If the substitution is made before invoking the graphics editor application, the avatar to be edited by the graphics editor application may include the substituted pictorial element(s). For simplicity's sake, it is assumed in FIGS. 7 to 9 below that the avatar to be edited is avatar 605/615 and no substitution of pictorial element(s) has (yet) taken place.

Figure 7:
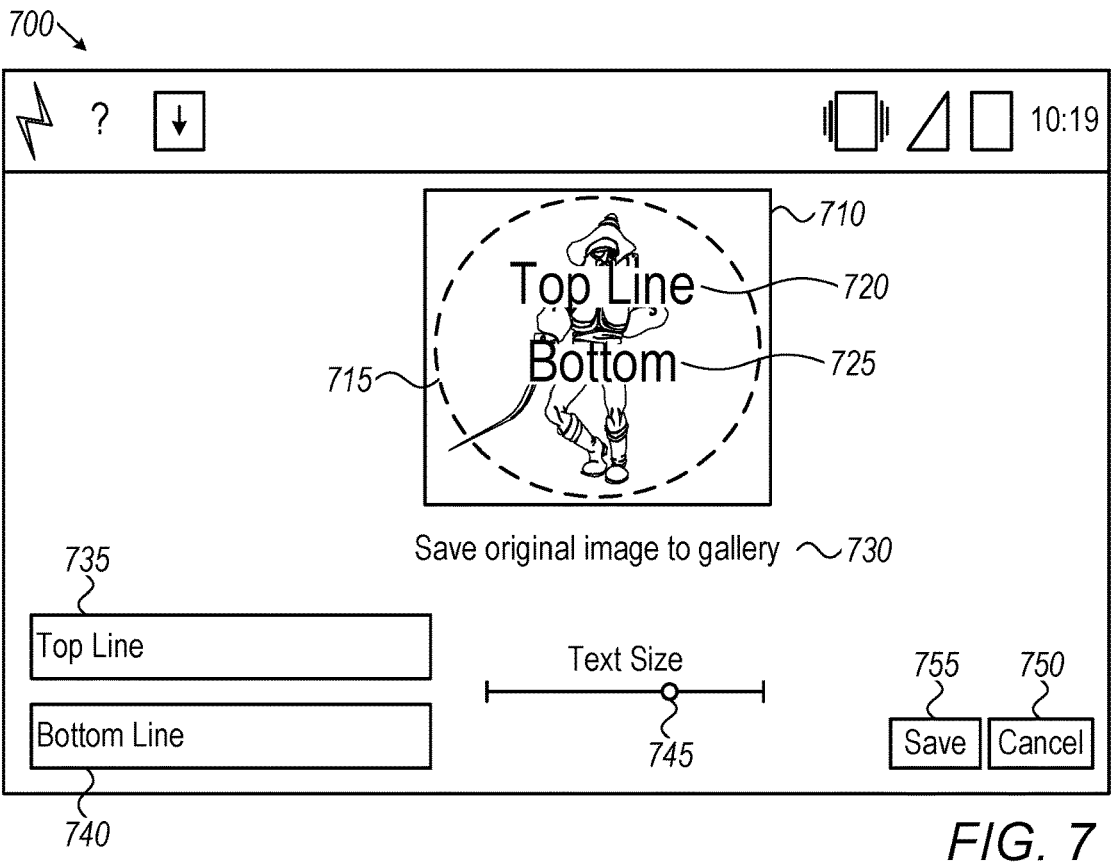
FIG. 7 is a simplified pictorial illustration of an exemplary graphics editor display, constructed and operative in accordance with some embodiments of the presently disclosed subject matter.

FIG. 7 is a simplified pictorial illustration of an exemplary graphics editor display 700, constructed and operative in accordance with some embodiments of the presently disclosed subject matter. In the illustrated embodiments, display 700 may include the image 710 from which the current avatar (e.g. avatar 605/615) derives. Dashed circle 715 may represent the boundaries of an avatar for the communication application. (For simplicity's sake it is assumed that the boundaries are similar for all user devices 220). Anything in image 710 that is outside circle 715 (such as the end of the cutlass) may not be displayed as the avatar in a display of the communication application. Display 700 may include the option to save the current (original) image 710 to a gallery (e.g. by using an input gesture such as clicking or tapping on the phrase "save original image to gallery" 730).

Text may be inputted by a user (e.g. the user Marcellos represented by the avatar) by way of the graphics editor application invoked by the communication application associated with user device 220A. For instance, display 700 may include one or more lines where text may be entered, e.g. by user input gestures such as keypresses. For the sake of example, two lines are shown in display 700, a top line 735 and a bottom line 740. For simplicity's sake, it is assumed that the graphics editor application may provide the text from the user, and select the characters to be overlaid over image 710 based on the text, by selecting characters that make up the entire entered text, although such an assumption may not necessarily be the case in some other embodiments. Top line 720 shows where the characters entered on top line 735 would be displayed and bottom 725 shows where characters entered on bottom line 740 would be displayed.

The size of the characters in the avatar may be adjusted by a user input gesture (e.g. click and drag) which moves size adjustor 745. Display 700 may include an option to cancel the changing of the avatar, e.g. by using a user input gesture such as clicking or tapping to select the word "cancel" 750. Display 700 may include an option to save the changed version of the avatar, e.g. by using a user input gesture such as clicking or tapping to select the word "save" 755.

In some embodiments, display 700 may include an option to substitute pictorial element(s) for image 710, e.g. by choosing a file. For example, a user input gesture such as click or tap may select the option, and then the user may browse for a file that includes pictorial element(s) to be used in the changed avatar. Additionally or alternatively, once the user selects the option to substitute pictorial element(s), an image search engine may search for an image with pictorial element(s), e.g. based on text entered on lines 735 and 740. The browsed-for file with the pictorial element(s) or the image found by the search engine may be substituted for image 710.

In some embodiments, in addition to, or instead of, entering text on lines 735 and 740, there may be a section of display 700 for entering text relating to the start time and/or expiration time of the avatar. For example, an input gesture such as a click or tap may open a calendar in display 700 and another click or tap may select the time(s) (e.g. date(s)) from the calendar which may be opened in display 700. The graphics application may use the text to select characters for the avatar, and/or the text may be used by one or more of user device(s) 220 and/or server(s) 210 to determine when the availability status will be changing again. For example, after the expiration date the avatar may revert back to current avatar 605/615.

Figure 8:
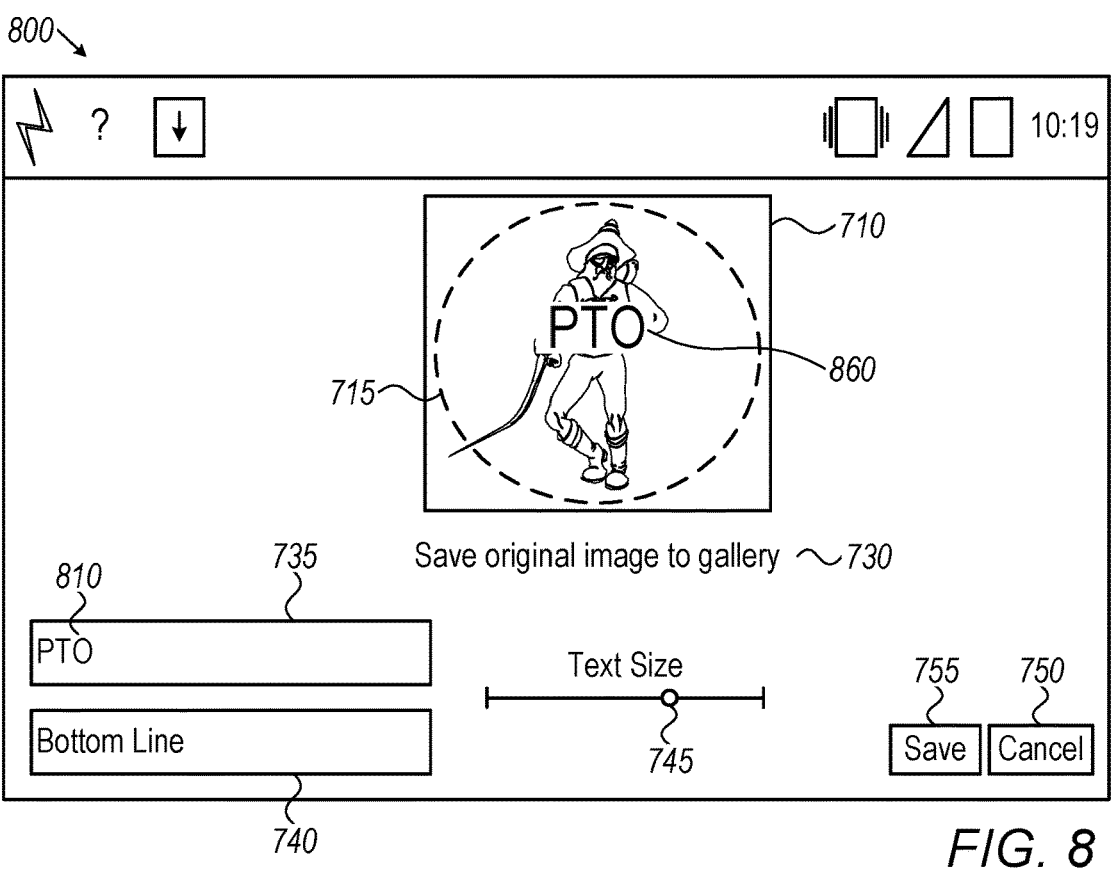
FIG. 8 is another simplified pictorial illustration of an exemplary graphics editor display, constructed and operative in accordance with some embodiments of the presently disclosed subject matter.

FIG. 8 is another simplified pictorial illustration of an exemplary graphics editor display 800, constructed and operative in accordance with some embodiments of the presently disclosed subject matter.

Display 800 is similar to display 700, except that "PTO" 810 has been entered as text on top line 735, and therefore the characters "PTO" 860 are overlaid on image 710 in place of "Top Line" 720. As no text was entered on bottom line 840, no characters appear in display 800 to replace "Bottom" 725 of FIG. 7. Alternatively, as no text was entered on bottom line 840, "PTO" may be overlaid in between where "Top line" 720 and "Bottom" 725 were shown before. In some embodiments, additional text may be entered on bottom line 740, causing characters in FIG. 8 to be overlaid on image 710 in place of "Bottom" 725 of FIG. 7. For instance, the additional text may further relate to the availability status such as location, expiration date (e.g. return date), contact number, etc., taking into account how many characters may fit within the boundaries 715 of the avatar. For example, large size characters stating "PTO" overlaid in place of "Top line" 720 and smaller size characters stating "7/29" overlaid in place of "Bottom" 725 may be understood by many viewers as meaning that the user is on paid time off until July 29.

Figure 9:
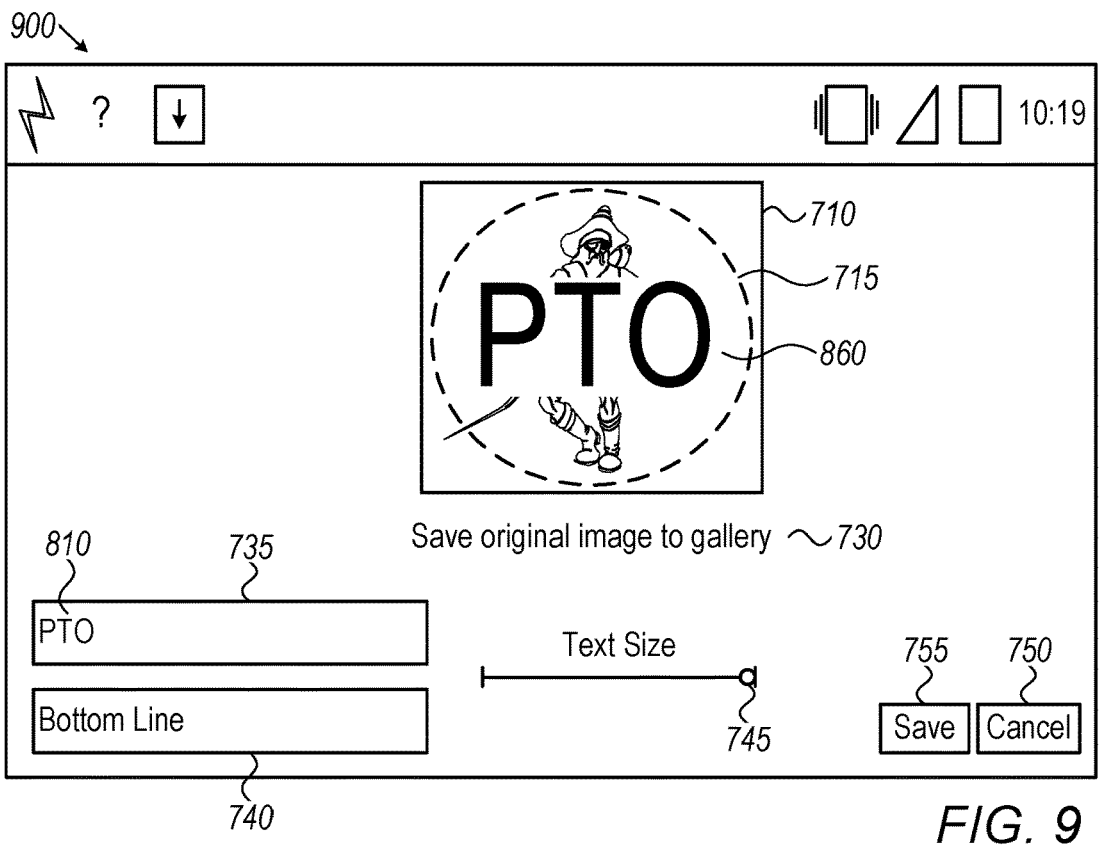
FIG. 9 is another simplified pictorial illustration of an exemplary graphics editor display, constructed and operative in accordance with some embodiments of the presently disclosed subject matter.

FIG. 9 is another simplified pictorial illustration of an exemplary graphics editor display 900, constructed and operative in accordance with some embodiments of the presently disclosed subject matter.

Display 900 is similar to display 800, except that size adjuster 745 has been moved further to the right for increased character size. Accordingly, characters "PTO" 860 are shown enlarged in display 900 compared to display 800. Character size may in some embodiments be instead decreased by moving size adjuster 745 to the left. In some embodiments, there may be a separate size adjuster for the top and bottom lines.

In some embodiments, there may be an option to adjust transparency/translucency/opacity of characters and/or of any overlay image. For example, a transparency adjuster (similar to size adjuster 745) may be added to displays 700, 800 and/or 900 and may allow the level of transparency to be adjusted, e.g. by an input gesture of click and drag to move the transparency adjuster to the right or to the left. In some embodiments, there may be an option to adjust the color of characters 860. For example, a color palette may be displayed in displays 700, 800 and/or 900 and color(s) from the color palette may be selected, e.g. by an input gesture of click or tap to select the color(s). For instance, the color white may be selected for characters 860.

Once a user (e.g. Marcellos) is satisfied with the appearance of characters 860, the user may save image 710 with characters 860 overlaid, by selecting "save" 755. The part of the image within the boundaries of dashed circle 715 may then be used as the (changed) avatar in displays of the communication application (see e.g. avatar 160 in display 100). Additionally or alternatively, in some cases, characters 860, with positioning and size as displayed, may be saved as an image (e.g. as an overlay image where the characters within the overlay image are white and opaque). The image may then be merged with image 710. Additionally or alternatively, in some cases, an overlay image such as a dark overlay image which is at least partially transparent may be saved. The overlay image may be merged with image 710 and with characters 860. In any of such cases, the merged image may be saved, and the part of the merged image within the boundaries of dashed circle 715 may be used as the (changed) avatar in displays of the communication application (see e.g. avatar 160 in display 100). Images discussed herein may be saved in any appropriate image format, such as portable network graphics ("PNG"), Joint Photographic Experts Group ("JPEG"), etc.

The subject matter is not bound by the functionality of the graphics editor application described herein nor by the appearance of graphics editor displays such as 700, 800 and 900. In some embodiments, the graphics editor application may work differently and/or displays of the graphic editor application may look different than displays 700, 800 and 900. Additionally or alternatively, in some embodiments, a text relating to availability status may be provided from the user but not through a graphics editor application.

The subject matter is also not bound by displays 100 and 600 of the communication application, and displays of the communication application may in some embodiments look different than displays 100 and 600.

More details on possible embodiments relating to any of methods 500, 540 and/or 570 will now be described with respect to FIGS. 10-12 where a text, if provided, is not provided from the user represented by the avatar, but is provided automatically or semi-automatically.

Figure 10:
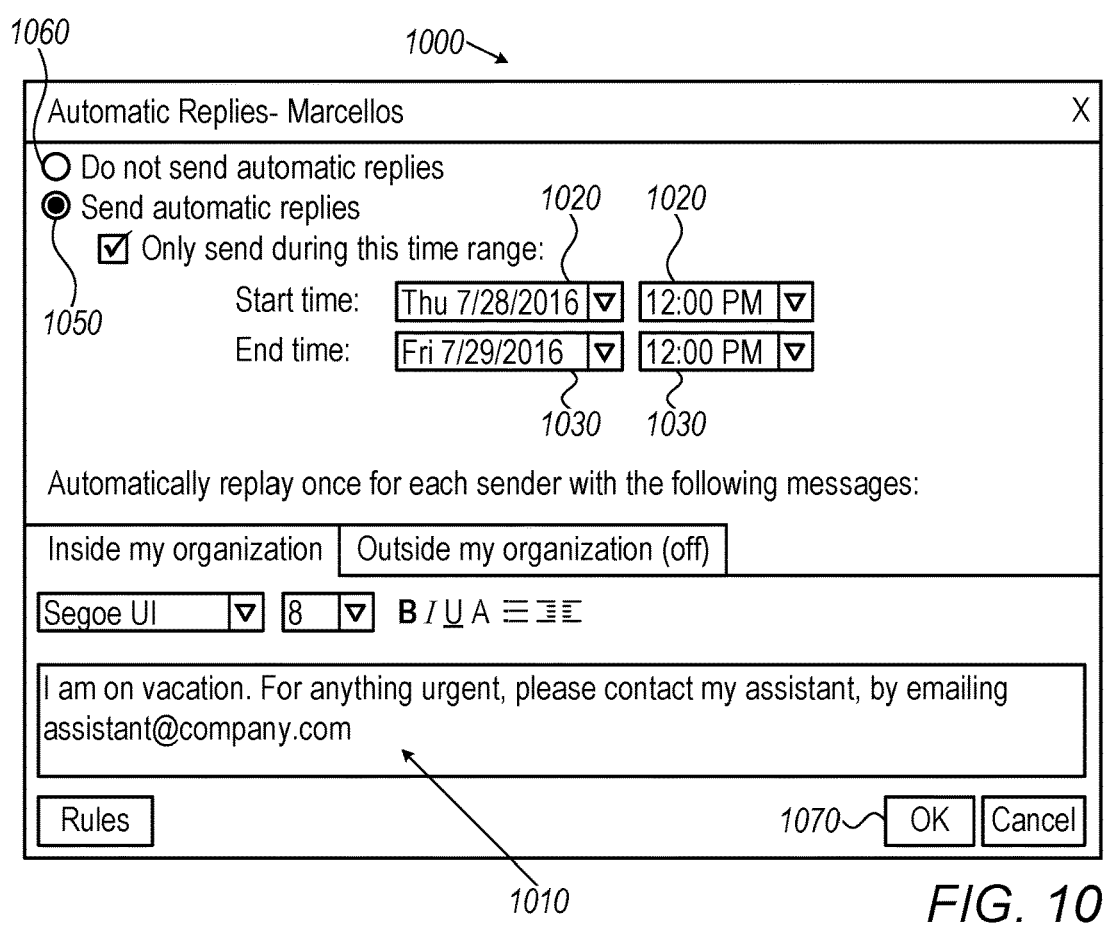
FIG. 10 is a simplified pictorial illustration of an exemplary display for setting up an out of office (automatic replies) message, constructed and operative in accordance with some embodiments of the presently disclosed subject matter.

Refer to FIG. 10 which illustrates a simplified pictorial illustration of an exemplary display 1000 for setting up an out of office (automatic replies) message, constructed and operative in accordance with some embodiments of the presently disclosed subject matter.

Display 1000 may be associated with the communication application, in whose display(s) an avatar may visually indicate the availability status of a user, or may be associated with another application (e.g. another communication application, where the other communication application may be associated with user device 220A that is associated with the user represented by the avatar). Display 1000 may be displayed on a screen embedded in or operatively coupled to user device 220A associated with the user (e.g. Marcellos) represented by the avatar.

The user may fill in any of fields 1010, 1020, 1030, 150 and/or 1060 to set up automatic replies in response to emails from inside the organization. (For simplicity's sake only the option of automatic replies to emails inside the organization is described, but similar fields may exist in a display for automatically replying to emails from outside the organization).

For the sake of example, assume that display 1000 is associated with another (e.g. communication) application rather than the communication application in whose display(s) an avatar may visually indicate the availability status, and that the other application and the communication application are associated with user device 220A. The communication application, associated with user device 220A, may receive via an Application Program Interface (API) to the other application the content of at least part of fields 1010, 1020, 1030 shown in out of office display 1000, e.g. when the out of office automatic reply transitions to being activated. For example, the selection of field 1050 for sending automatic replies, to replace the previous selection of field 1060 for not sending automatic replies along with a user input gesture such as clicking or tapping an OK button 1070 may activate the out of office reply. (If the display is instead associated with the communication application in whose displays the avatar represents the user, then the content may be accessed without an API).

T communication application may determine from receipt of the content that there has been an activation of an out of office message, representative of an alteration in messaging data. Text mapping and/or natural language processing may be applied to the messaging data by way of the communication application invoking a basic text mapper (e.g. that maps data to predefined text) and/or a natural language processing application that may be capable of searching the received content in order to provide a text that relates to availability status from the content. The text may therefore be based on messaging data (more specifically relating to the out of office message). The text mapper and/or natural language processing application may for example, be part of the additional computer readable program code associated with user device 220A that is associated with Marcellos. The additional computer readable program code and/or the communication application associated with user device 220A, may cause user device 220A to perform method 500 and/or method 570.

The text mapper and/or natural language processing application may select character(s) that relate to the availability status based on the text that relates to the availability status. For example the text relating to availability status may include the content of fields 1010, 1020, 1030. The characters selected may include "PTO til 7/29", based on the text. It is noted that in such an instance the characters "PTO" are selected instead of "vacation". It is also noted that in such an instance, the characters selected are less than in the text, e.g. so as to fit in the boundaries of the avatar, e.g. with "PTO" substituting for "vacation", and the characters not including the year nor the start time. It is further noted that the characters "til" are included for clarity even though not in the text.

For simplicity's sake it is assumed that an image is then generated rather than retrieved by the communication application associated with user device 220A. An image with the characters relating to the availability status may be generated, for instance by the communication application performing any of the examples of generation described above, e.g. with reference to stage 520. The avatar that includes the characters relating to the availability status may be the image or may derive from the image. The avatar may be transmitted, for example to server(s) 210 which may then transmit the avatar to other user device(s) 220 (e.g. including 220B associated with Keith). If the start time of the vacation is after the present time, the communication application associated with user device 220A may for instance, postpone performance of at least stage 530 until right before the start time, or for instance may transmit a start of validity time along with the avatar.

In some embodiments, the communication application may retrieve the image that was used before the out of office was activated, based, for instance, on the end time that was included in the "Vacation 7/28/2016 7/29/2016" text, or, for instance, when there is a lack of a text relating to the availability status of "out of office". For instance, if the out of office message relates to another (e.g. communication) application, the communication application in whose displays an avatar may visually indicate the availability status may receive via an API to the other application an alert that the out of office message has been deactivated. Otherwise, if the out of office message relates to the communication application, the communication application may determine without an API that the out of office has been deactivated. For example, selection of field 1060 for not sending automatic replies that replaces the previous selection of field 1050 for sending automatic replies, along with an input gesture such as clicking or tapping OK button 1070 may deactivate the out of office reply. Depending on the embodiment, the retrieved image may or may not include characters relating to the in-office status. The avatar that is the retrieved image or derives from the retrieved image may then be transmitted to server(s) 210 which may then transmit the avatar to other user device(s) 220 (e.g. including 220B associated with Keith). The avatar may be the default avatar.

In some embodiments any function attributed to user device 220A in the description of FIG. 10 may additionally or alternatively be performed by any other user device(s) 220 and/or any server(s) 210. The subject matter is also not bound by the description of avatars with respect to an out of office message and in some embodiments, the relationship between avatars and an out of office message may be different than described.

Refer now to FIG. 11 which illustrates a calendar 1100 of a particular user such as Marcellos, in accordance with some embodiments of the presently disclosed subject matter. The calendar data may be data of the communication application in whose display(s) the avatar may represent Marcellos, or may be data of another application (e.g. a scheduling application such as the scheduling part of Microsoft Outlook, if the communication application is not Microsoft Outlook). The calendar shows a meeting on July $27^{th}$ between 10 and 11.30, and vacation on July $28^{th}$. The calendar data may have been filled in by the particular user (e.g. Marcellos), or automatically e.g. by the scheduling application, by a conferencing application such as Cisco WebEx® etc.

The content of the calendars of various users including Marcellos, and certain avatars (e.g. default avatars) and/or images from which the avatars derive (if not the same) for various users of the communication application are assumed in such embodiments to be available on server(s) 210 which manages the communication application and optionally the other application (if the calendar data is data of the other application rather than of the communication application). Text mapping and/or natural language processing may be applied to the calendar data by way of the computer readable program code for managing the communication application on server(s) 210 invoking a basic text mapper (e.g. that maps data to predefined text) and/or natural language processing application to search the content of the calendars. The text mapper and/or natural language processing application may for example, be part of the additional computer readable program code on server(s) 210 Such additional computer readable program code and/or computer readable program code for managing the communication application, may cause server(s) 210 to perform method 500 and/or method 540.

For example, the invoking of the text mapper and/or natural language processing application may occur periodically, e.g. daily, so that availability status of the user may update automatically as per the calendar data. The text mapper or natural language processing application may provide a text relating to availability status such as a text of "Meeting LOAM 11 AM 7/27/2016" based on the calendar data for Jul. 27, 2016. The text mapper or natural language processing application may select the characters "meeting" relating to the availability status. It is noted that in such a case the characters in the avatar may be less than the text, for instance so as to fit in the boundaries of the avatar. The text mapper or natural language processing application may further provide a text relating to availability status such as a text of "on vacation 7/28/2016" based on the calendar data for Jul. 28, 2106. The text mapper or natural language processing application may select the characters "PTO til 7/29". It is noted that in such a case the characters "til 7/29" were included e.g. for clarity even though not in the text, that "PTO" was substituted for "on vacation" and that 7/28/2106 was eliminated, e.g. so as to fit in the boundaries of the avatar.

For simplicity's sake it is assumed that images relating to the above mentioned availability statuses may be generated rather than retrieved by the computer readable program code for managing the communication application on server(s) 210. The computer readable program code for managing the communication application may generate an image with the characters "meeting", e.g. by performing any of the examples of generation described with reference to stage 520. The avatar that includes the characters "meeting" may be the image or may derive from the image. The avatar may be transmitted, for example to one or more user devices 220 (e.g. including 220B associated with Keith). As the meeting start time is assumed to begin after the searching time of the calendars, the computer readable program code for managing the communication application on server(s) 210 may for instance, postpone performance of at least stage 530 until right before the start of the meeting time, or for instance may transmit a start of validity time along with the avatar.

Similarly, the computer readable program code for managing the communication application may generate an image with the characters "PTO til 7/29" by performing any of the examples of generation described with reference to stage 520. The avatar that includes the characters "PTO til 7/29" may be the image or may derive from the image. The computer readable program code for managing the communication application may transmit an avatar including the characters "PTO til 7/29" to one or more user devices 220 (e.g. including 220B associated with Keith). As the vacation start time is assumed to begin after the searching time of the calendars, the computer readable program code for managing the communication application may for instance, postpone performance of at least stage 530 until right before the start of the vacation (e.g. until around 11.59 PM of July $27^{th}$), or for instance may transmit a start of validity time along with the avatar.

In between the meeting and vacation, and after the vacation, the image that was used before the meeting, may be retrieved by the computer readable program code for managing the communication application, for instance, based on the end of meeting time and end of vacation time in the texts, or based on texts provided in other periodic searches of the calendar data. The retrieved image (e.g. which may be a default avatar for Marcellos or image from which the default avatar derives) may or may not include characters relating to an availability status such as "available" (e.g. which may be the default availability status). The avatar that is the retrieved image or derives from the retrieved image may be transmitted by the computer readable program code for managing the communication application to other user device(s) 220 (e.g. including 220B associated with Keith).

In some embodiments any function attributed to server(s) 210 in the description of FIG. 11 may additionally or alternatively be performed by any user device(s) 220. The subject matter is also not bound by the description of avatars with respect to a calendar and in some embodiments, the relationship between avatars and a calendar may be different than described.

Figure 12:
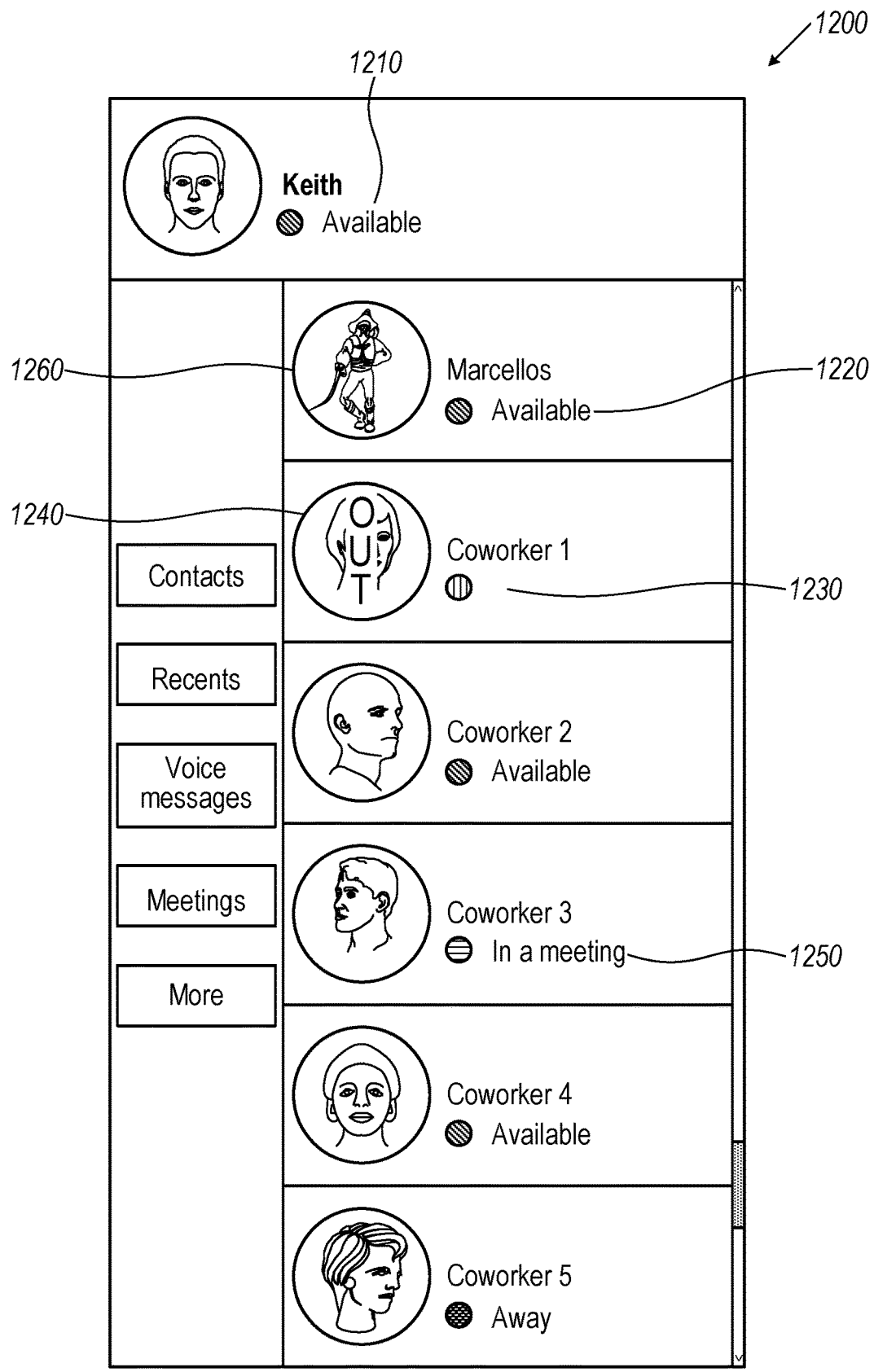
FIG. 12 illustrates a simplified pictorial illustration of an exemplary display, constructed and operative in accordance with some embodiments of the presently disclosed subject matter.

FIG. 12 illustrates a simplified pictorial illustration of an exemplary display 1200, constructed and operative in accordance with some embodiments of the presently disclosed subject matter. Display 1200 may be a display of the communication application in whose display(s) an avatar may visually indicate availability status or may be a display relating to another application (e.g. another [communication] application associated with user device 220B that is associated with Keith). For example, display 1200 may be a display of the communication application, provided the communication application is a presence based communication application such as Jabber®. Alternatively, for example, the communication application may be a non-presence based communication application, and display 1200 may be a display of another application (e.g. a presence based communication application). In the latter example, the communication application and the other application may both be associated with user device 220B that is associated with Keith. In either example, display 1200 may be displayed on a screen embedded in or operatively coupled to user device 220B.

Presence data may include any data associated with a presence based communication application. For example, in display 1200, the presence data may include the descriptive data under the names of the users, the colors and/or shading of the dots next to the descriptive data, etc.

In FIG. 12, presence data 1210 (e.g. descriptive data) may have been entered by the user associated with user device 220B (e.g. Keith), or may have been generated by the presence based communication application, for example from an out of office message, and/or by any other means of detecting presence employed by the presence based communication application. Similarly, presence data 1220 (e.g. descriptive data) relating to Marcellos may have been provided from Marcellos, or may have been generated by the presence based communication application for example from an out of office message, and/or by any other means of detecting presence by the presence based communication application. Presence data of coworkers 1 to 5 are also shown in display 1200.

If display 1200 associated with user device 220B relates to another application, the communication application associated with user device 220B may receive via an API to the other application, any presence data (e.g. descriptive data), which has been altered. If display 1200 relates to the communication application, then the communication application associated with user device 220B may detect altered presence data. The communication application associated with user device 220B may thus determine that the availability status of one or more users may have changed. Text mapping and/or natural language processing may be applied to the presence data by way of the communication application invoking a basic text mapper (e.g. that maps data in fields to predefined text) and/or a natural language processing application that may be capable of searching any altered presence data (e.g. of the various coworkers, including Marcellos and coworkers 1 to 5 shown in display 1200) and providing for each of the coworkers with altered presence data a text that relates to the respective availability status. The text mapper and/or natural language processing application may for example, be part of the additional computer readable program code associated with user device 220B that is associated with Keith. The additional computer readable program code and/or the communication application associated with user device 220B, may cause user device 220B to perform method 500.

For example, once Marcellos is back from vacation, and presence data 1220 is altered to "Available", the text provided for Marcellos may be "Available". The text mapper or natural language processing application may for instance select no characters in order to indicate the "available" availability status. As another example, presence data 1230 for coworker 1 may have been altered to be blank, e.g. indicative of an "out" availability status, and therefore for coworker 1 there may be a lack of any text relating alternative availability status. The text mapper or natural language processing application may select for instance the characters "out" based on the lack of any alternative availability text, in order to indicate the "out" availability status. As another example, the presence data 1250 for co-worker 3 may have been altered to "in a meeting", and therefore the text provided for co-worker 3 may be "in a meeting". The text mapper or natural language processing application may select for instance the characters "meeting" in order to indicate the "in meeting" availability status.

The communication application associated with user device 220B may then generate or retrieve an image for any co-worker with altered presence data, e.g. as described above in stage 520 and change the avatar in any appropriate display(s) associated with user device 220B for any co-worker with altered presence data. For example, the avatar representing Marcellos in display(s) of the communication application to Keith may be changed to an avatar indicative of the "available" availability status, rather than of vacation. Similarly in the example, the avatar representing coworker 1 in display(s) of the communication application to Keith may be changed to an avatar indicative of the "out" availability status. Continuing with the example and assuming display 1200 relates to the communication application, the avatar 1260 representing Marcellos may be an avatar without characters such as avatar 605/615, and the avatar 1240 representing coworker 1 may be an avatar including the characters "out". As another example, the avatar representing co-worker 3 in display(s) of the communication application to Keith (may include the characters "meeting" (where in this example, the communication application is assumed to not be the application that is associated with display 1200, and therefore no avatar is shown in FIG. 12 with the characters "meeting").

In some embodiments any of the functions described with reference to FIG. 12 may be additionally or alternatively performed by server(s) 210. Additionally or alternatively, in some embodiments a particular user device 220 may only check presence data relating to the user associated with that user device 220. For example, user device 220A, associated with Marcellos may determine that presence data for Marcellos has changed, and cause the avatar on other user device(s) (e.g. 220B) to be changed accordingly. The subject matter is also not bound by the description of avatars with respect to presence data and in some embodiments, the relationship between avatars and presence data may be different than described.

Referring to any of the embodiments described above with reference to FIG. 10, 11 or 12, in some of such embodiments generation of an image may include selection of another image relating to the availability status. In such embodiments, the particular user device 220 or server 210 which is performing the selection may use any appropriate technique to perform the selection. For example, the communication application may invoke any suitable image search engine to use the text relating to the availability status provided by the natural language processing application and/or text mapper to search for images relating to the availability status of the user. In various cases, images on the particular user device 220 or server 210, on other servers 210 and/or user devices 220 in system 200, and/or external to system 200 (e.g. on the world wide web), may be searched. The closest image found by the image search engine, or any other image found by the image search engine may then be selected as the image relating to the availability status to be used when generating the image that is the avatar or from which the avatar derives, e.g. as described above with reference to stage 520.

The subject matter is not bound by displays 1000 and 1200 and displays of the communication application may in some embodiments look different than displays 1000 and 1200.

The subject matter is also not bound by the examples of automatic or semi-automatic provision of text, or lack of text described with reference to FIGS. 10, 11, and 12, and in some embodiments, other types of text or no text may be provided, other types of applications may be used, and/or other techniques may be used, etc.

In some embodiments, the presentation format of any of displays 100, 600, 700, 800, 900, 1000, 1200 may be modified to conform to physical constraints, e.g. of a given type of user device 220. In such embodiments, the overall functionality may or may not remain generally consistent with the description provided above.

In some embodiments, software components of the presently disclosed subject matter may, if desired, be implemented in ROM (read only memory) form. The software components may, in some embodiments, be implemented in hardware, if desired, using conventional techniques.

In the above description of example embodiments, numerous specific details are set forth in order to provide a thorough understanding of the subject matter. However, it will be understood by those skilled in the art that some examples of the subject matter may be practiced without these specific details. In other instances, well-known features have not been described in detail so as not to obscure the subject matter.

The communication application that has an avatar acting as a visual indicator of availability status may vary depending on the example, but for the sake of further illustration to the reader some examples of the communication application are now provided. For example, the communication application may be any application for communicating between and/or among users, e.g. communicating between any two users of the communication application and/or communicating among any three or more users of the communication application, although the words "between" and "among" may be used interchangeably herein. Examples of such a communication application may include instant messaging application(s), social network application(s), collaboration application(s), email application(s), and/or any other type(s) of communication application(s).

A communication application that supports instant messaging (IM), such as an instant messaging application or a collaboration application, may provide real-time communication, often called "posts" or "chats", between or among two or more users of the instant messaging application, thereby supporting a "conversation", or in other words an exchange of messages between or among the users over a network, such as, for example, the Internet. For example, a collaboration application may be a type of communication application that supports instant messaging, as well as communication not always supported by an instant messaging application, such as presentation of a conversation's history, meeting and/or calling etc. An example of a collaboration application may be Cisco Spark®. In some embodiments, the communication application where an avatar may act as a visual indicator of availability status may be a collaboration application or any other type of application which supports instant messaging, but in other embodiments, the communication application that has an avatar acting as a visual indicator of availability status may not support instant messaging.

In some embodiments, the communication application that has an avatar acting as a visual indicator of availability status, may be an enterprise communication application, used by co-workers, suppliers, and/or clients, etc. In some other embodiments, the communication application that has an avatar acting as a visual indicator of availability status may not be an enterprise communication application. In some embodiments, the communication application that has an avatar acting as a visual indicator of availability status may be considered to be presence based, whereas in other embodiments the communication application that has an avatar acting as a visual indicator of availability status may not be considered to be presence based.

In some embodiments there may be a plurality of communication applications in whose displays an avatar may act as a visual indicator of availability status. In such embodiments, the plurality of communication applications may or may not all have the same features, e.g. regarding support of instant messaging (or not), enterprise or non-enterprise, presence or non-presence based, etc. For example, if there is a plurality of such communication applications, part may be considered to be presence based and part may not be considered to be presence based.

In accordance with some embodiments of the subject matter, an avatar may act as a visual indicator of the availability status of a particular user of the communication application for other users of the communication application, because the avatar may include character(s) that relate to the availability status of the particular user.

The character(s) included in an avatar that relate to availability status may include any symbol(s) which by convention may be meaningful to a human. For example, the character "$" may symbolize dollar(s) to a human, the character "a" may symbolize the first letter of the Latin alphabet to a human, the characters "10" may symbolize the tenth number in the decimal numeral system to a human, the character "." may symbolize an end of a sentence to a human, the characters "- >" may symbolize a range to a human, a Chinese character may symbolize one or more words to a human, etc.

In some embodiments, the character(s) included in an avatar that relate to availability status may include at least one alphanumeric character, and optionally other type(s) of character(s). However, in some other embodiments, the included character(s) may not necessarily include at least one alphanumeric character.

In some cases, an avatar that includes character(s) relating to availability status may be considered to convey availability status information in a manner which leaves little or no room for misinterpretation. However, in other cases, the meaning of the included characters(s) may not necessarily be unambiguous with regards to the availability status. For example, the characters "OL" may be understood to be the letters "O" and "L". However the meaning of the combination may be understood as an acronym for the availability status of "on-leave" or the availability status of "online". Similarly, the characters "return 6/7" may be understood to represent a return date but the availability status may be ambiguous as the return date may be understood to be July $6^{th}$ or June $7^{th}$ depending on the date convention employed by the viewer.

The appearance of character(s) included in an avatar that relate to availability status may vary depending on the embodiment, and the character(s) may appear in any suitable font, glyph(s), size, level of transparency/translucency/opacity (if any), color, positioning, direction (e.g. horizontal, vertical), case (e.g. uppercase, lowercase), etc. Regarding size, the character(s) may be of various sizes depending on the size of the avatar, the number of character(s), default settings, settings provided by a user, etc. For example, unless adjusted by the user, the character(s) may be configured to span at least 90% of the avatar. Regarding level of transparency/translucency/opacity, the character(s) may be of various transparency levels depending on the settings provided by a user, default settings, etc. For example, unless adjusted by a user, the level of transparency of the character(s) may be 50% transparency. Regarding color, the character(s) may be of various colors depending on the color(s) of element(s) (that are not character(s) relating to availability status) in the avatar (if any), default settings, settings provided by a user, etc. For example, unless adjusted by a user, the color of the character(s) may be black. Regarding positioning and direction of character(s), the positioning and direction of the character(s) may be of various positioning and directions depending on the shape of the avatar, the number of character(s), the size of the character(s), the convention for writing the character(s) (e.g. the characters "CAT" in English may typically be written horizontally from left to right), defaults settings, settings provided by a user, etc. For example, unless adjusted by a user, the character(s) may be positioned in the center of the avatar and the direction of the character(s) may be in accordance with convention. Regarding case, the case may be of various cases depending on the number of lines, number of character(s), default settings, settings provided by a user, etc. For example, unless adjusted by a user, the first line of character(s) may be in upper case and any subsequent lines in lower case. Moreover, the character(s) that are included may or may not all be fully formed. For example, it may be possible that one or more included characters may appear partly cut off, for instance due to extending past the avatar boundaries. For characters relating to alphabets, logograms, etc. and/or numbers, the script or numeral system, to which such character(s) may belong, may vary depending on the embodiment.

In some cases, character(s) included in an avatar may be selected based on a text that was provided relating to an availability status of the user. For simplicity's sake, the term "text" is used in the single form herein when referring to a text relating to an availability status, based on which character(s) may be selected, and should be understood to include embodiments where there may be a single text relating to the availability status and/or embodiments where may be a plurality of texts, which collectively may be considered to be a text relating to the availability status. Such a text may have been provided from a user, e.g. the user represented by the avatar, provided automatically, or provided semi-automatically.

The term "text" should be construed broadly as any form of text data, including data which may be encoded in accordance with a character encoding standard (such as Unicode or American Standard Code for Information Interchange (ASCII)) and/or the resulting encoded data. The length of a text, the content of a text and other characteristics of a text, may vary depending on the embodiment.

Depending on the embodiment, character(s) selected based on a text may or may not all be from the text, may or may not be representative of the entire text, and/or may or may not be limited to the text. In some embodiments, the character(s) may not necessarily all be from the text, may not necessarily be representative of the entire text, and/or may not necessarily be limited only to the text, due to any appropriate reason(s). For example, the character(s) may not represent the entire text, if the text is too long, and the selected character(s) may more concisely indicate the availability status. As another example, additionally or alternatively, the character(s) may not all be from the text, as the selected characters may indicate more consistently the availability status, whereas possible texts that may be provided for the same availability status may vary. As another example, additionally or alternatively, the character(s) may include at least one character not in the text, for additional clarity.

In some other cases, additionally or alternatively, character(s) included in an avatar may be selected based on a lack of any text relating to alternative availability status of the user. For instance, referring to the other cases, included character(s) may relate to an "in office" status of the user if there is no text indicating that the user is currently out of the office, whereas for instance, referring to cases where character(s) may be selected based on a text, included character(s) may relate to an "in-office" availability status of the user if there is a text indicating when the user is in the office (e.g. due to an expiration time for the out of office availability status, such as a return date in an out of office message or a return date provided from a user, or due to an automatic reply message actually stating that the user is currently in the office). In some embodiments, there may be a lack of any text relating to alternative availability status when a certain availability status of a user is a default availability status, but in some other embodiments, this may not necessarily be the case. The default availability status, for example, may be the most common availability status, e.g. occurring most frequently for this user and/or occurring most frequently for most users. In the example, the default availability status may vary depending on the embodiment. For instance, in some embodiments, the default availability status may be in office, in, available, or similar, whereas in some other embodiments, the default availability status may be out, out of office, away or similar.

When stating herein with respect to some embodiments, that a text may have been provided from a user or equivalently that the text may be from a user, it should be understood that the user may have inputted the text for the sake of changing an avatar or creating an initial avatar. When stating herein with respect to some embodiments that the text may have been provided automatically it should be understood that no user inputted the text for the sake of changing of an avatar or creation of an initial avatar, although it is possible that the content of the text may have originated from a human (e.g. the user represented by the avatar) for another purpose. Semi-automatic provision may include any combination of automatic and human intervention, for example a user (e.g. represented by the avatar) may have indicated that a text should be provided (e.g. by indicating that the avatar is to be changed or initially created), and consequently the text may have been provided automatically. The term "change" or variants thereof when used herein with reference to an avatar should be understood as meaning either or both of two possible definitions of the word, namely "replace" as in replace the avatar, or "make different" as in make the avatar different.

In some embodiments, an avatar may act as a visual indicator of availability status by excluding character(s) relating to availability status. For example, there may be a certain availability status (e.g. a default availability status) and if an avatar representing a user excludes characters relating to availability status, the avatar may thus convey that the user has that certain availability status. In some of such embodiments, the display of an avatar representing a user without such characters when the user has that certain availability status may occur when a text relating to that certain availability status was provided, and/or when there is a lack of any text relating to alternative availability status.

For example, assume that an avatar that represents a user when the user has an "in the office" availability status excludes such characters. Further assume that a previously provided out of office message included an expiration time (e.g. date of return), or a user previously entered an expiration time (e.g. date of return) relating to an out of office availability status, and therefore the text relating to the out of office availability status also related to the in office availability status. In this example, due to the expiration time, the avatar that represents the user after the expiration time may exclude characters relating to availability status, thus conveying that the user is in the office. Additionally or alternatively, for example if an automatic reply message actually states that the user is now in the office, the avatar that represents the user may exclude characters relating to availability status, thus conveying that the user is in the office. Additionally or alternatively, for example, if there is a lack of any text relating to alternative availability status (e.g. because there is no up to date out of office message, an earlier one having been deactivated), the avatar that represents the user may exclude characters relating to availability status, thus conveying that the user is in the office.

Depending on the embodiment, an avatar may or may not include element(s) that are not character(s) relating to availability status, such as characters unrelated to availability status or pictorial element(s). In some embodiments, an avatar that includes character(s) relating to availability status, may only include the character(s) relating to availability status. However, in some other embodiments, an avatar may include other element(s) that are not character(s) relating to availability status, in addition to or instead of character(s) relating to availability status. Pictorial element(s) in an avatar may be construed broadly as anything in an avatar that is not a character. For example, pictorial element(s) may include one or more people, nature, man-made object(s), etc.

In some cases, an avatar that represents a user may additionally or alternatively act as a visual indicator of the availability status of the user due to non-character element(s) in the avatar, if any, such as pictorial element(s) that may be included in the avatar and that are supposed to depict the availability status of the user. In some of such cases, the pictorial element(s) in the avatar may be selected based on the availability status of the user. However, in other cases, the pictorial element(s), if any in the avatar, may not convey availability status information, or may not do so unambiguously. Indeed, even in embodiments where pictorial element(s) may be selected in order to convey availability status information, the user that views the avatar may not necessarily understand the meaning. For example, an avatar of a user depicting a beach may be interpreted by a viewer as meaning that the user is on vacation or that the weather is sunny where the user lives. As another example, an avatar depicting a phone may be interpreted by a viewer as indicating that some of the character(s) in the avatar, if any, relate to a phone number, or that the user is on the phone.

The term "availability status" should be construed broadly and may vary depending on the example. However, for the sake of further illustration to the reader, some examples are now provided. For example, the availability status of a user may provide answers to "where" (e.g. where the user is, etc.), "what" (e.g. what is the name/characteristics of the status, what the user is doing, etc.), "how" (e.g. how available is the user, how the user is transitioning to the status, how to reach the user while at the status, etc.), "when" (when the user will be at the status, for how long the user will be at the status, the time zone relevant to the status, etc.), and/or "why" (why the user is at the status such as business, family, why the user is not reachable, etc.). Examples of possible availability status names/characteristics may include "out" or "out of office", "busy", "in" or "in office", "available", "unavailable", "on vacation" or "paid time off", "away" "sick", "unpaid leave", "working from home", "online", "offline", "on leave", "away" "in a meeting", "on the phone", "at a client", "business trip", a combination of any of the above, "not" any one of the above (e.g. not on vacation), etc.

For example, the availability status may be more restricted or less restricted. For instance, an availability status that is less restricted may not be bounded by time, whereas one that is more restricted may be bounded by time, such as beginning and/or ending time of a meeting, expiration time of the status (e.g. return date), date(s) of vacation, etc. Continuing with this instance, a user may have the availability status of being in a meeting or the availability status of being in a meeting from the beginning time until the ending time. For instance, an availability status that is less restricted may not be bounded to location(s), whereas one that is more restricted may be bounded to location(s) such as the location of a business trip, time zone information, etc. Continuing with this instance, a user may have the availability status of being on a business trip, or the availability status of being on a business trip in place X, Greenwich Mean Time (GMT)+y. For example, the degree of availability represented by two contrasting availability statuses may be more clearly delineated (e.g. the user may be contacted when in the office or may not be contacted when not in the office) or the degree of availability may be less clearly delineated (e.g. by including contact information for when the user is out of the office), etc.

Usage of the terms "normally", "typically although not necessarily", "although not necessarily so", "although not necessarily", "not necessarily the case", "not necessarily", "such as", "e.g.", "possibly", "it is possible", "optionally", "say", "one embodiment", "embodiments", "an embodiment", "some embodiments", "certain embodiments", "example embodiments", "various embodiments", "other embodiments", "some other embodiments", "illustrated embodiments", "another embodiment", "for example" "one example", "an example" "some examples", "examples", "another example", "various examples", "other examples", "for instance", "an instance", "one instance", "some instances", "another instance", "other instances", "various instances" "one case", "cases", "some cases", "another case", "other cases", "various cases", or variants thereof should be construed as meaning that a particular described feature is included in at least one non-limiting embodiment of the subject matter, but not necessarily in all embodiments. The appearance of the same term does not necessarily refer to the same embodiment(s).

The term "illustrated embodiments", is used to direct the attention of the reader to one or more of the figures, but should not be construed as necessarily favoring any embodiments over any others.

Usage of conditional language, such as "may", "can", "could", or variants thereof should be construed as conveying that one or more embodiments of the subject matter may include, while one or more other embodiments of the subject matter may not necessarily include, a particular described feature. Thus such conditional language is not generally intended to imply that a particular described feature is necessarily included in all embodiments of the subject matter. Non-usage of conditional language does not necessarily imply that a particular described feature is necessarily included in all embodiments of the subject matter.

The terms "generate" and "create" are used interchangeably herein.

As used herein terms such as "using", "obtaining", "selecting", "providing", "causing", "acting", "indicating", "displaying", "identifying", "representing", "determining", "creating", "generating", "changing", "replacing", "making", "substituting", "receiving", "transmitting", "sending", "providing", "invoking", "overlaying", "retrieving", "storing", "merging", "comparing", "performing", "checking", "applying", "implementing", "calculating", "processing", "configuring", "defining", "computing", "executing", "communicating", "presenting", "enabling", "allowing", "responding", or the like should be construed in some embodiments as referring to the action(s) and/or process(es) of a computer, whereas in other embodiments, not necessarily. The action(s) and/or process(es) may, for instance, manipulate and/or transform data represented as physical quantities, such as electronic quantities, into other data similarly represented as physical quantities, although not necessarily. In some embodiments, a computer may be specially constructed and/or specially configured to perform operation(s) attributed to the computer in those embodiments. The term "computer" as used herein may refer to any type of electronic device that includes at least one processor, or to a plurality of such electronic devices including processor(s), even if not colloquially referred to as a computer. Examples of a computer may include any user device 220; any server 210; and/or a plurality of user device(s) 220 and/or server(s) 210. Therefore, in various embodiments, reference herein to a computer may refer to a single user device 220; to a single server 210; or to a plurality of user device(s) 220 and/or server(s).

It will be appreciated that the subject matter contemplates, for example, a computer program product comprising a computer readable medium having computer readable program code embodied therein for executing one or more methods and/or one or more parts of method(s) disclosed herein. Further contemplated, for example, are computer readable program code for executing method(s) and/or part(s) of method(s) disclosed herein; and/or a computer readable medium having computer readable program code embodied therein for executing method(s) and/or part(s) of method(s) disclosed herein.

It will also be appreciated that various features of the subject matter which are, for clarity, described in the contexts of separate embodiments may also be provided in combination in a single embodiment. Conversely, various features of the subject matter which are, for brevity, described in the context of a single embodiment may also be provided separately or in any suitable subcombination.

It will further be appreciated by persons skilled in the art that the presently disclosed subject matter is not limited by what has been particularly shown and described hereinabove. Rather the scope of the subject matter is defined by the appended claims and equivalents thereof:

What is claimed is:

1. A method, comprising:
  maintaining an avatar of a user for a communication application;

receiving a text relating to availability status of the user to participate in communication over the communication application;

determining, from natural language processing of the text, whether a user is available or unavailable to participate in communication over the communication application;

identifying any text relating to alternative availability status of the user;

obtaining an image including one or more characters that reflect the results of the determining, the one or more characters selected based on the text and the identifying failing to identify any text relating to alternative availability status of the user;

determining if the communication application is a presence-based application or a non-presence based application; and representing the user, in one or more displays of the communication application to one or more other users of the communication application, as a combination of the avatar with an overlay of (a) the image or (b) a derivation of the image, and includes the one or more characters based at least in part on the determining, wherein if the communication application is a non-presence based application, updating the representing of the avatar after a delay of an amount time.

2. The method of claim 1, further comprising: determining that a current avatar is to be changed.

3. The method of claim 2, wherein said determining includes at least one of: receiving an indication that the current avatar is to be changed, determining availability status of the user, determining that the current avatar has timed out, receiving an indication relating to availability status, or determining that availability status of the user has changed or will be changing.

4. The method of claim 1, further comprising, providing the text.

5. The method of claim 4, wherein the text is from the user or from one of the one or more other users.

6. The method of claim 5, wherein the text is inputted by the user by way of a graphics editor application invoked by the communication application.

7. The method of claim 4, wherein said providing includes: providing the text automatically or semi-automatically.

8. The method of claim 1, wherein said image includes only the one or more characters.

9. The method of claim 1, wherein said obtaining includes receiving the image.

10. The method of claim 1, wherein said obtaining includes retrieving the image.

11. The method of claim 1, further comprising subsequent to said representing:

obtaining a second image without characters relating to availability status of the user and therefore indicative of another availability status, or obtaining a third image that includes at least one character that are not all identical to the one of more characters, the at least one character included in the third image relating to the other availability status of the user; and causing a next avatar, that is without characters relating to availability status and therefore indicative of the other availability status or that includes the at least one character relating to the other availability status, and that is the second or third image or derives from the second or third image, to represent the user in at least one display of the communication application to the one or more other users.

12. A system, comprising:
a processor;
a memory storing instructions which when executed by the processor cause the system to perform operations, comprising:
maintain an avatar of a user for a communication application;
receive a text relating to availability status of the user to participate in communication over the communication application;
determine, from natural language processing of the text, whether a user is available or unavailable to participate in communication over the communication application;
identify any text relating to alternative availability status of the user;
obtain an image including one or more characters that reflect the results of the determine, the one or more characters selected based on the text and failure to identify any text relating to alternative availability status of the user;
determine if the communication application is a presence-based application or a non-presence based application; and
represent the user, in one or more displays of the communication application to one or more other users of the communication application, as a combination of the avatar and an overlay of (a) the image or (b) a derivation of the image, and includes the one or more characters, based at least in part on the determining, wherein if the communication application is a non-presence based application, updating the representing of the avatar after a delay of an amount time.

13. The system of claim 12, wherein the system includes a user device associated with the user.

14. The system of claim 12, wherein the system includes a server associated with the communication application.

15. The system of claim 12, wherein the system includes a user device associated with any one of the one or more other users.

16. A non-transitory computer readable media storing instructions which when executed cause a system to perform operations comprising:

maintaining an avatar of a user for a communication application;

receiving a text relating to availability status of the user to participate in communication over the communication application;

determining, from natural language processing of the text, whether a user is available or unavailable to participate in communication over the communication application;

identifying any text relating to alternative availability status of the user;

obtaining an image including one or more characters that reflect the results of the determining, the one or more characters selected based on the text that was provided relating to the availability status of the user, and the identifying failing to identify any text relating to alternative availability status of the user;

determining if the communication application is a presence-based application or a non-presence based application; and representing the user, in one or more displays of the communication application to one or more other users of the communication application, as a combination of the avatar and (a) the image or (b) a derivation of the image, and includes the one or more characters, based at least in part on the determining, wherein if the communication application is a non-presence based application, updating the representing of the avatar after a delay of an amount time.

* * * * *